(12) United States Patent
Inari et al.

(10) Patent No.: US 8,710,134 B2
(45) Date of Patent: Apr. 29, 2014

(54) (METH)ACRYLIC RESIN COMPOSITION, IMIDIZED (METH)ACRYLIC RESIN COMPOSITION, AND FILM OBTAINED BY MOLDING THEM

(75) Inventors: Hirofumi Inari, Osaka (JP); Katsuyuki Tanaka, Osaka (JP); Kimihide Nishimura, Hyogo (JP)

(73) Assignee: Kaneka Corporation, Osaka (JP)

( * ) Notice: Subject to any disclaimer, the term of this patent is extended or adjusted under 35 U.S.C. 154(b) by 395 days.

(21) Appl. No.: 12/446,864

(22) PCT Filed: Nov. 9, 2007

(86) PCT No.: PCT/JP2007/071789
§ 371 (c)(1),
(2), (4) Date: Apr. 23, 2009

(87) PCT Pub. No.: WO2008/056769
PCT Pub. Date: May 15, 2008

(65) Prior Publication Data
US 2010/0092792 A1 Apr. 15, 2010

(30) Foreign Application Priority Data

Nov. 10, 2006 (JP) ................................. 2006-305719
Sep. 19, 2007 (JP) ................................. 2007-242926
Sep. 21, 2007 (JP) ................................. 2007-245658

(51) Int. Cl.
*C08L 33/06* (2006.01)
*C08F 8/32* (2006.01)
*C08F 220/00* (2006.01)
*C08F 265/00* (2006.01)

(52) U.S. Cl.
USPC ........... 524/457; 524/458; 524/461; 524/302; 524/515; 524/529; 526/201

(58) Field of Classification Search
USPC ................. 524/457, 458, 461, 302, 515, 529; 526/201
See application file for complete search history.

(56) References Cited

U.S. PATENT DOCUMENTS

| 2006/0100391 A1 | 5/2006 | Matsumoto et al. |
| 2006/0183858 A1 | 8/2006 | Takesada et al. |

FOREIGN PATENT DOCUMENTS

| JP | 60-120734 | | 6/1985 |
| JP | 62-4704 | | 1/1987 |
| JP | 62-129333 | | 6/1987 |
| JP | 62-129334 | | 6/1987 |
| JP | 62-129338 | | 6/1987 |
| JP | 5-59252 | | 3/1993 |
| JP | 2004-292812 | | 10/2004 |
| JP | 2005-163005 | | 6/2005 |
| JP | 2005163005 A | * | 6/2005 |
| JP | 2005-290136 | | 10/2005 |
| JP | 2005290136 A | * | 10/2005 |
| JP | 2006-57000 | | 3/2006 |
| WO | WO 2004/087810 | | 10/2004 |

* cited by examiner

*Primary Examiner* — Kelechi Egwim
(74) *Attorney, Agent, or Firm* — Hamre, Schumann, Mueller & Larson P.C.

(57) ABSTRACT

The present invention provides a (meth)acrylic resin composition comprising a carboxylic acid group produced by heating a (meth)acrylic-based resin (C), wherein the (meth)acrylic-based resin (C) is obtained by polymerizing a monomer mixture (A) containing 80 to 99 wt % of a linear alkyl (meth)acrylate and 1 to 20 wt % of tertiary-butyl (meth)acrylate, in the presence of an acrylic acid ester-based crosslinked elastic particle (B) that is obtained by mixing and polymerizing 0.5 to 5 parts by weight of a polyfunctional monomer having at least two non-conjugated double bonds per molecule, with respect to 100 parts by weight of a monomer mixture containing 50 to 100 wt % of an alkyl acrylate monomer and 0 to 50 wt % of an alkyl methacrylate monomer. This composition can be used to produce a film having excellent chemical resistance (in particular, sun-screening agent resistance).

12 Claims, No Drawings

(METH)ACRYLIC RESIN COMPOSITION, IMIDIZED (METH)ACRYLIC RESIN COMPOSITION, AND FILM OBTAINED BY MOLDING THEM

TECHNICAL FIELD

The present invention relates to a (meth)acrylic resin composition, an imidized (meth)acrylic resin composition, and a film obtained by molding them.

BACKGROUND ART

Recently, in the market, there is a strong interest in films having excellent chemical resistance, thermal resistance, hardness, folding resistance, and whitening-upon-folding resistance. Specifically, they are used, for example, as films used to laminate vehicle interior or exterior parts as a coating substitute, films used as a floor material, and the like. However, conventional acrylic films do not have sufficient chemical resistance, thermal resistance, hardness, folding resistance, and whitening-upon-folding resistance, which are properties needed for these applications.

Polyglutarimide obtained by treating an acrylic-based resin with an imidizing agent, thereby introducing an imide group into a high-molecular weight chain, is known as a resin that can be provided with chemical resistance, thermal resistance, and hardness. In particular, an imidized acrylic resin, that is obtained by copolymerizing methacrylic acid and/or tertiary-butyl methacrylate with methyl methacrylate using a solution polymerization method or block polymerization method, heating the resultant to form an acid anhydride unit, and then reacting this unit with an imidizing agent, is disclosed as a resin having excellent thermal resistance and chemical resistance (see Patent Document 1).

However, this resin is very brittle, and, thus, there is a problem in which, when the resin is formed into a film and used to laminate a base material, the folding resistance of the film, which is needed as a property for such treatment, is poor.

Thus, in order to address this problem, an imidized acrylic resin having excellent chemical resistance, thermal resistance, and hardness, and improved folding resistance and whitening-upon-folding resistance, obtained by treating a methacrylic-based resin composition with an imidizing agent is disclosed in which the methacrylic-based resin composition comprises a methacrylic acid ester-based polymer and an acrylic acid ester-based crosslinked elastic particle each having specific constituent materials. The average particle size of and the amount of polyfunctional monomer used in the crosslinked elastic particle (B) satisfy a specific formula (see Patent Document 2). This fluidized acrylic resin has excellent chemical resistance. However, a chemical resistance that is also effective against a sun-screening agent (e.g., Coppertone (registered trademark)) and the like has come to be required in recent applications to vehicle parts, and, thus, there is a demand for further improvement in the chemical resistance to such specific agents.

Also, a rubber-containing acrylic resin having improved thermal resistance, solvent resistance, and optical isotropy, comprising glutaric acid anhydride groups formed by heating a resin copolymerized in advance with 15 to 50 wt % of unsaturated carboxylic acid, is disclosed (see Patent Document 3). In the case where a large amount of acid anhydride groups are contained as in this resin, resistance to an organic solvent and the like is excellent, but there is a problem in that the resistance to an aqueous alkali solution and the like becomes poor.

Thus, there is no resin in which the resistances to various agents are well balanced and there is a demand for the development of such a resin.

Conversely, an imidized acrylic resin and a glutaric acid anhydride-containing resin have high melt viscosities, and, thus, there is room for improvement in that film defects such as die lines occur when the resins are molded into a film using a T-die-equipped extruder or the like, and productivity is lowered when foreign substances are melt-filtered.

Patent Document 1: JP S62-4704A
Patent Document 2: JP 2005-290136A
Patent Document 3: JP 2004-292812A

DISCLOSURE OF INVENTION

Problem to be Solved by the Invention

It is an object of the present invention to provide a (meth)acrylic resin composition or an imidized (meth)acrylic resin composition from which a film having excellent whitening-upon-folding resistance and chemical resistance (in particular, Coppertone (registered trademark) resistance) can be obtained. It is also an object thereof to provide a (meth)acrylic resin composition having improved alkali resistance or lowered melt viscosity.

Means for Solving Problem

The present inventors conducted an in-depth study, and found that a (meth)acrylic resin composition comprising a carboxylic acid group produced by heating a (meth)acrylic-based resin obtained from a methacrylic acid ester copolymer having a prescribed amount of tertiary-butyl (meth)acrylate and an acrylic acid ester-based crosslinked elastic particle can be used to produce a film having, in particular, excellent sun-screening agent resistance. Furthermore, they found that, when the acid value of the (meth)acrylic resin composition is controlled, a film having excellent sun-screening agent resistance, alkali resistance, and xylene resistance can be produced, and, when the melt viscosity of the (meth)acrylic resin composition is controlled, film moldability is improved. Moreover, they found that, when the (meth)acrylic resin composition is imidized using an ammonia-based compound, the sun-screening agent resistance is improved further, and, thus, the present invention was achieved.

That is to say, the present invention is directed to:

[1] A (meth)acrylic resin composition obtained by heating a (meth)acrylic-based resin (C), wherein the (meth)acrylic-based resin (C) is obtained by polymerizing a monomer mixture (A) containing 80 to 99 wt % of a linear alkyl (meth)acrylate and 1 to 20 wt % of tertiary-butyl (meth)acrylate, in the presence of an alkyl acrylate-based crosslinked elastic particle (B) that is obtained by mixing and polymerizing 0.5 to 5 parts by weight of a polyfunctional monomer having at least two non-conjugated double bonds per molecule, with respect to 100 parts by weight of a monomer mixture containing 50 to 100 wt % of an alkyl acrylate monomer and 0 to 50 wt % of an alkyl methacrylate monomer;

[2] the (meth)acrylic resin composition according to [1], wherein a thermoplastic resin (D) is blended with the (meth)acrylic-based resin (C);

[3] the (meth)acrylic resin composition according to [1] or [2], wherein the acid value of the (meth)acrylic resin composition is at least 0.3 mmol/g and less than 0.7 mmol/g;

[4] the (meth)acrylic resin composition according to [3], wherein the acid value of the thermoplastic resin (D) is less than 0.7 mmol/g;

[5] the (meth)acrylic-based resin composition according to [1] or [2], wherein a melt viscosity of the (meth)acrylic resin composition at 260° C. and 122 sec$^{-1}$ is not greater than 20000 poise;

[6] an imidized (meth)acrylic resin obtained by imidizing the (meth)acrylic resin composition according to any one of [1] to [5] using an ammonia-based compound;

[7] a film obtained by molding the (meth)acrylic resin composition according to any one of [1] to [5] or the imidized (meth)acrylic resin according to [6]; and

[8] a laminated product obtained by laminating a metal or a plastic with the film according to [7].

Effects of the Invention

The present invention can provide a (meth)acrylic resin composition from which a film having excellent chemical resistance (in particular, Coppertone (registered trademark) resistance) can be obtained. Also, when the acid value of the resin composition is controlled, a film also having improved alkali resistance can be produced.

Furthermore, when the melt viscosity of the resin composition is controlled, moldability is improved, and, thus, a film having a good appearance can be produced.

DESCRIPTION OF THE INVENTION

The present invention relates to a (meth)acrylic resin composition and an imidized (meth)acrylic resin composition. In the present invention, "(meth)acrylic-based resin" refers to an acrylic-based resin and/or a methacrylic-based resin.

The (meth)acrylic resin composition of the present invention is obtained by heating a (meth)acrylic-based resin (C), wherein the (meth)acrylic-based resin (C) is obtained by polymerizing a monomer mixture (A) in the presence of an alkyl acrylate-based crosslinked elastic particle (B).

The acrylic acid ester-based crosslinked elastic particle (B) of the present invention is obtained by copolymerizing 0.5 to 5 parts by weight of a polyfunctional monomer having two or more non-conjugated double bonds per molecule, with respect to 100 parts by weight of a monomer mixture (b) containing 50 to 100 wt % of alkyl acrylate monomer and 0 to 50 wt % of alkyl methacrylate monomer, in one or more stages (the monomer constituent materials or the reaction conditions can be adjusted so as to perform multi-stage copolymerization). It is more preferable that the monomer mixture (b) contains 60 to 100 wt % of alkyl acrylate monomer and 0 to 40 wt % of alkyl methacrylate monomer. It is preferable that the alkyl methacrylate monomer is contained in a ratio of 50 wt % or less in view of the folding resistance of a molded product or a film that can be formed from the obtained (meth) acrylic resin composition.

It is preferable that the alkyl acrylate, alkyl methacrylate, and other reactive monomers of the monomer mixture (b) used in the crosslinked elastic particle (B) have an alkyl group with 1 to 12 carbon atoms in view of the polymerization reactivity or the cost. Specific examples thereof include methyl methacrylate, ethyl methacrylate, propyl methacrylate, n-butyl methacrylate, methyl acrylate, n-butyl acrylate, and the like. These monomers may be used alone or in a combination of two or more types.

If necessary, the monomer mixture (b) of the crosslinked elastic particle (B) of the present invention may be copolymerized with, for example, an ethylene-based unsaturated monomer that can be copolymerized with the alkyl acrylate monomer and the methacrylic acid ester monomer. Examples of the copolymerizable ethylene-based unsaturated monomer include: vinyl halides, such as vinyl chloride and vinyl bromide; vinyl cyanides, such as acrylonitrile and methacrylonitrile; aromatic vinyls, such as vinyltoluene, vinylnaphthalene, styrene, and α-methyl styrene; vinyl esters, such as vinyl formate, vinyl acetate, and vinyl propionate; vinylidene halides, such as vinylidene chloride and vinylidene fluoride; acrylic acid and its salts, such as acrylic acid, sodium acrylate, and calcium acrylate; alkyl acrylate derivatives, such as β-hydroxyethyl acrylate, dimethylaminoethyl acrylate, glycidyl acrylate, acrylamide, and N-methylolacrylamide; methacrylic acid and its salts, such as methacrylic acid, sodium methacrylate, and calcium methacrylate; alkyl methacrylate derivatives, such as methacrylamide, β-hydroxyethyl methacrylate, dimethylaminoethyl methacrylate, and glycidyl methacrylate; and the like. These monomers may be used alone or in a combination of two or more types.

The acrylic acid ester-based crosslinked elastic particle (B) of the present invention has a copolymerized polyfunctional monomer having two or more non-conjugated reactive double bonds per molecule, and, thus, the obtained polymer typically exhibits crosslink-elasticity. Also, it seems that one reactive functional group (double bond) of the polyfunctional monomer remaining unreacted during polymerization to form the acrylic acid ester-based crosslinked elastic particle (B) functions as a grafting intersection, and part of the monomer mixture (A) is grafted to the acrylic acid ester-based crosslinked elastic particle (B).

Examples of the polyfunctional monomer used in the present invention include allyl methacrylate, allyl acrylate, triallyl cyanurate, triallyl isocyanurate, diallyl phthalate, diallyl malate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylolmethane tetramethacrylate, tetramethylolmethane tetraacrylate, dipropylene glycol dimethacrylate, dipropylene glycol diacrylate, and the like. These polyfunctional monomers may be used alone or in a combination of two or more types.

In the acrylic acid ester-based crosslinked elastic particle (B) of the present invention, the amount of polyfunctional monomer copolymerized is preferably 0.5 to 5 parts by weight, and more preferably 1.0 to 4 parts by weight, with respect to 100 parts by weight of a monomer mixture (b). It is preferable that the amount of polyfunctional monomer copolymerized is 0.5 to 5 parts by weight in view of the folding resistance, whitening-upon-folding resistance, and resin flowability.

The acrylic acid ester-based crosslinked elastic particle (B) of the present invention has an average particle size of preferably 500 to 2000 Å, more preferably 500 to 1600 Å, even more preferably 500 to 1200 Å, and particularly preferably 600 to 1200 Å. It is preferable that the average particle size is 500 to 2000 Å in view of the folding resistance, whitening-upon-folding resistance, and transparency.

Here, the average particle size refers to a value obtained by measurement performed using a light scattering method with a particle sizer (MICROTRAC UPA150 manufactured by Leed & Northrup Instruments).

The (meth)acrylic-based resin (C) used in the present invention is obtained by polymerizing a monomer mixture (A) mainly comprising methacrylic acid ester in the presence of the acrylic acid ester-based crosslinked elastic particle (B). It is preferable that the (meth)acrylic-based resin (C) is obtained by polymerizing 95 to 25 parts by weight of a monomer mixture (A) (described below) in one or more stages in the presence of 5 to 75 parts by weight of the acrylic acid ester-based crosslinked elastic particle (B) (described above).

The monomer mixture (A) of the present invention preferably contains 80 to 99 wt % of a linear alkyl (meth)acrylate and 1 to 20 wt % of tertiary-butyl(meth)acrylate, more preferably contains 85 to 99 wt % of a linear alkyl(meth)acrylate and 1 to 15 wt % of tertiary-butyl (meth)acrylate, even more preferably contains 88 to 95 wt % of a linear alkyl (meth)acrylate and 5 to 12 wt % of tertiary-butyl (meth)acrylate, and particularly preferably contains 90 to 95 wt % of a linear alkyl (meth)acrylate and 5 to 10 wt % of tertiary-butyl (meth)acrylate. It is preferable that the tertiary-butyl (meth)acrylate is contained in a ratio of 1 to 20 wt % because the colorless transparency, the folding resistance, the thermal resistance, and the sun-screening agent resistance (Coppertone (registered trademark) resistance) of the obtained film are well balanced. Furthermore, it is preferable that the tertiary-butyl (meth)acrylate is contained in a ratio of 1 to 15 wt % because the alkali resistance of the obtained film can be improved.

It is preferable that the linear alkyl (meth)acrylate reactive monomers of the monomer mixture (A) have an alkyl group with 1 to 12 carbon atoms in view of the polymerization reactivity or the cost. Specific examples thereof include methyl methacrylate, ethyl methacrylate, propyl methacrylate, n-butyl methacrylate, methyl acrylate, n-butyl acrylate, and the like. These monomers may be used alone or in a combination of two or more types.

If necessary, the monomer mixture (A) of the present invention may be copolymerized with, for example, an ethylene-based unsaturated monomer that can be copolymerized with the linear alkyl (meth)acrylate monomer and the tertiary-butyl (meth)acrylate monomer. Specific examples of the copolymerizable ethylene-based unsaturated monomer include those used in the crosslinked elastic particle (B).

In this case, a component (free polymer) that is an ungrafted polymer, which has not been grafted to the acrylic acid ester-based crosslinked elastic particle (B), is formed in the monomer mixture (A). Part ((B) and grafted (A)) of the (meth)acrylic-based resin (C) is insoluble in methyl ethyl ketone.

In the present invention, the grafting ratio of the (meth)acrylic-based resin (C) is preferably 100 to 160%, and more preferably 120 to 140%. It is preferable that the grafting ratio falls within this range in view of the colorless transparency and the whitening-upon-folding resistance of the obtained film.

Here, the grafting ratio of the (meth)acrylic resin composition of the present invention was measured using the following method.

More specifically, 1 g of (meth)acrylic-based resin (C) was dissolved in 40 ml of methyl ethyl ketone, and the solution was centrifuged using a centrifugal separator (CP60E manufactured by Hitachi Koki Co., Ltd.) at a rotational speed of 3000 rpm for 1 hour, and separated by decantation into methyl ethyl ketone-insoluble matter and soluble matter. The obtained methyl ethyl ketone-insoluble matter was taken as an acrylic acid ester-based crosslinked elastic body-containing grafted copolymer, and the grafting ratio was calculated using the following equation.

Grafting ratio (%)={(weight of methyl ethyl ketone-insoluble matter−weight of acrylic acid ester-based crosslinked elastic particle (B))/weight of acrylic acid ester-based crosslinked elastic particle (B)}×100

There is no particular limitation on a method for producing the (meth)acrylic-based resin (C) of the present invention. It is possible to use known methods, such as an emulsion polymerization method, an emulsion-suspension polymerization method, a suspension polymerization method, and the like, but an emulsion polymerization method is particularly preferable.

As an initiator in the polymerization of the acrylic acid ester-based crosslinked elastic particle (B) and the polymerization of the monomer mixture (A), known initiators such as an organic peroxide, an inorganic peroxide, an azo compound, and the like may be used. Specific examples thereof include: an organic peroxide, such as tertiary-butyl hydroperoxide, 1,1,3,3-tetramethylbutyl hydroperoxide, succinic acid peroxide, tertiary-butyl peroxymaleate, cumene hydroperoxide, and benzoyl peroxide; an inorganic peroxide, such as potassium persulfate, and sodium persulfate; and an oil-soluble initiator, such as azobisisobutyronitrile. These initiators may be used alone or in a combination of two or more types. These initiators may be used as an ordinary redox-type initiator in combination with a reducing agent, such as sodium sulfite, sodium thiosulfate, sodium formaldehyde sulfoxylate, ascorbic acid, hydroxyacetic acid, ferrous sulfate, a complex of ferrous sulfate and ethylenediaminetetraacetic acid disodium, and the like.

The organic peroxide may be added using known adding methods, such as a method in which the organic peroxide is directly added to a polymerization system, a method in which the organic peroxide is mixed with a monomer and then added, a method in which the organic peroxide is dispersed in an aqueous emulsifier solution and then added, or the like. It is preferable to use a method in which the organic peroxide is mixed with a monomer and then added or a method in which the organic peroxide is dispersed in an aqueous emulsifier solution and then added in view of the transparency.

Also, it is preferable that the organic peroxide is used as a redox-type initiator in combination with an inorganic reducing agent, such as bivalent iron salt, and/or an organic reducing agent, such as sodium formaldehyde sulfoxylate, a reducing sugar, ascorbic acid, in view of the polymerization stability and particle size control.

There is no particular limitation on a surfactant used in the emulsion polymerization, and it is possible to use any ordinary surfactant for emulsion polymerization. Specific examples thereof include: anionic surfactants, such as sodium alkylsulfonate, sodium alkylbenzene sulfonate, dioctyl sodium sulfosuccinate, and sodium lauryl sulfate; non-ionic surfactants, such as the reaction products of alkylphenols or aliphatic alcohols and propylene oxide or ethylene oxide; and the like. These surfactants may be used alone or in a combination of two or more types. Furthermore, if necessary, cationic surfactants, such as an alkylamine salt, may be used.

The amount of the initiator added in the polymerization of the monomer mixture (b) in the acrylic acid ester-based crosslinked elastic particle (B) and the monomer mixture (A) is preferably 0.03 to 3.5 parts by weight, more preferably 0.1 to 2.5 parts by weight, and even more preferably 0.2 to 1.5 parts by weight, with respect to 100 parts by weight of the acrylic acid ester-based crosslinked elastic particle (B) or monomer mixture (A). It is preferable that the amount of the initiator added falls within this range in view of the mechanical strength and the molding processability of the obtained (meth)acrylic composition.

In the present invention, a chain transfer agent may be used in order to control the molecular weight of the polymer obtained by polymerizing the monomer mixture (A). Examples of the chain transfer agent include methyl mercaptan, ethyl mercaptan, isopropyl mercaptan, n-butyl mercaptan, tertiary-butyl mercaptan, n-hexyl mercaptan, n-octyl mercaptan, n-dodecyl mercaptan, ethyl thioglycolate, mercapto ethanol, thio-β-naphthol, thiophenol, dimethyl disulfide, and the like. These chain transfer agents may be used alone or in a combination of two or more types.

The amount of the chain transfer agent used is preferably 0.02 to 2.2 parts by weight, more preferably 0.1 to 1.5 parts by weight, and even more preferably 0.2 to 1.0 parts by weight, with respect to 100 parts by weight of the monomer mixture (A). It is preferable that the amount of the chain transfer agent used falls within this range in view of the mechanical strength and the molding processability of the obtained (meth)acrylic composition.

In the present invention, the amount of the acrylic acid ester-based crosslinked elastic particle (B) contained in the (meth)acrylic-based resin (C) is preferably 5 to 40 wt %, and more preferably 10 to 35%, with respect to 100 wt % of the (meth)acrylic-based resin (C). It is preferable that the amount of the acrylic acid ester-based crosslinked elastic particle (B) contained falls within this range in view of the molding processability and the folding resistance of the obtained (meth)acrylic composition.

In the case where the (meth)acrylic-based resin (C) is obtained as a latex by emulsion polymerization or the like, the (meth)acrylic-based resin (C) can be separated and recovered by coagulation, washing and drying, or spray drying, freeze drying, or the like.

In the resin composition of the present invention, if necessary, a thermoplastic resin (D) may be blended with the (meth)acrylic-based resin (C).

Examples of the thermoplastic resin (D) in the present invention include polyglutarimide, glutaric anhydride resin, lactone-cyclized methacrylic-based resin, methacrylic-based resin, styrene-based resin, methyl methacrylate-styrene copolymer, polyethylene terephthalate resin, polybutylene terephthalate resin, and the like. Of these resins, methacrylic-based resin is preferable in view of miscibility with the (meth)acrylic-based resin (C), weather resistance, and transparency.

In the case where a methacrylic-based resin is used as the thermoplastic resin (D) in the present invention, the thermoplastic resin (D) is obtained by copolymerizing a monomer mixture preferably containing 50 to 100 wt % of alkyl methacrylate, 0 to 50 wt % of alkyl acrylate, and 0 to 6 wt % of (meth)acrylic acid, and more preferably containing 60 to 100 wt % of alkyl methacrylate, 0 to 40 wt % of alkyl acrylate, and 0 to 5 wt % of (meth)acrylic acid, in one or more stages. In particular, in the case where emphasis is placed on the hardness and the rigidity of the obtained film, the monomer mixture of the methacrylic-based polymer (D) contains methyl methacrylate in a ratio of preferably 80 wt % or more, more preferably 85 wt % or more, even more preferably 90 wt % or more, and particularly preferably 92 wt % or more.

The ratio of the thermoplastic resin (D) blended is preferably such that 50 to 100 parts by weight of the (meth)acrylic-based resin (C) and 0 to 50 parts by weight of the thermoplastic resin (D) are contained, more preferably 50 to 90 parts by weight of the (meth)acrylic-based resin (C) and 10 to 50 parts by weight of the thermoplastic resin (D) are contained, and even more preferably 60 to 80 parts by weight of the (meth)acrylic-based resin (C) and 20 to 40 parts by weight of the thermoplastic resin (D) are contained, in view of the shock resistance and whitening-upon-folding resistance. There is no particular limitation on the blending method, and it is possible to use known methods.

The acid value of the thermoplastic resin (D) blended in the present invention is preferably less than 0.7 mmol/g, and more preferably less than 0.6 mmol/g. It is preferable that the acid value of the thermoplastic resin (D) is less than 0.7 mmol/g in view of the alkali resistance of the obtained (meth)acrylic resin composition.

In the present invention, "heating" refers to a process of heating the (meth)acrylic-based resin (C) at a prescribed temperature, thereby causing thermal desorption of a tertiary-butyl group as isobutylene from a tertiary-butyl (meth)acrylate group, and forming a carboxylic acid group by conversion.

There is no particular limitation on the heating, as long as the (meth)acrylic-based resin (C) can be heated, but it is preferable to use melt-kneading with an extruder as a method for uniformly heating the (meth)acrylic-based resin (C).

The heating temperature for forming a carboxylic acid group is preferably 200 to 320° C., and more preferably 220 to 300° C. It is preferable that the heating temperature is 200 to 320° C. because a tertiary-butyl group is desorbed easily, a carboxylic acid group is formed easily, and a transparent (meth)acrylic resin composition is obtained.

In the present invention, in the case where an extruder is used for heating, examples of the extruder include a single-screw extruder, a double-screw extruder, a multi-screw extruder, and the like. The extruder is preferably a single-screw extruder, and more preferably a double-screw extruder. The double-screw extruder may be of a non-intermeshing co-rotating type, an intermeshing co-rotating type, a non-intermeshing counter-rotating type, or an intermeshing counter-rotating type. These extruders may be used alone or in series.

In the case where such an extruder is used, in order to remove the byproduct isobutylene, the extruder preferably has a vent-port that can reduce the pressure to atmospheric pressure or lower, and more preferably has vent-ports arranged in multiple lines. The extruder used in the present invention preferably has vent-ports arranged in multiple lines, but it is preferable that the vent-port pressure is controlled so as to be −0.09 MPa or lower in gauge pressure. If the vent-port pressure is higher than −0.09 MPa, the efficiency in removing residual monomers and byproducts tends to be reduced.

In the heating of the present invention, for example, a reactor that can be used for highly viscous materials, such as a horizontal double-screw reactor such as a BIVOLAK, or a vertical double-screw agitation vessel, such as a SUPERBLEND, manufactured by Sumitomo Heavy Industries, Ltd.; also can be used preferably instead of the extruder.

There is no particular limitation on a batch-type reaction vessel (pressure vessel) for production via a batch-type reaction, as long as the polymer can be heated. Examples thereof include an agitation vessel MAXBLEND manufactured by Sumitomo Heavy Industries, Ltd., and the like.

In the present invention, heating is performed preferably for 30 minutes or less, and more preferably for 20 minutes or less. If the reaction time is longer than 30 minutes, decomposition of the resin occurs based on its thermal history, and the yellowness index of the film tends to be increased.

In the present invention, when the (meth)acrylic-based resin (C) is heated, commonly used agents, such as; weather resistance stabilizers, such as antioxidants, thermal stabilizers, light stabilizers, ultraviolet absorbers, radical scavengers; catalysts; plasticizers; lubricants; antistatic agents; colorants; shrinkage inhibitors; antibacterial and deodorizing agents; and the like may be added alone or in a combination of two or more types, within a range that does not impair the objects of the present invention. Also, these additives may be added when molding a (meth)acrylic resin composition.

In the present invention, the acid value of the (meth)acrylic resin composition is preferably 0.2 to 0.7 mmol/g, more preferably 0.3 mmol/g or more and less than 0.7 mmol/g, and even more preferably 0.4 mmol/g or more and less than 0.6 mmol/g. It is preferable that the acid value of the (meth)acrylic resin composition is 0.2 to 0.7 mmol/g because the sun-screening agent resistance and the melt viscosity of the obtained film are well balanced.

Furthermore, it is preferable that the acid value of the (meth)acrylic resin composition is 0.3 mmol/g or more and less than 0.7 mmol/g because the sun-screening agent resistance and the alkali resistance of the obtained film are well balanced.

Here, in the present invention, "acid value" refers to a value obtained by adding a prescribed amount of aqueous sodium hydroxide solution to a resin dissolved in a solvent, and subjecting this solution to neutralization titration using an aqueous hydrochloric acid solution.

In the present invention, the melt viscosity of the (meth)acrylic resin composition at 260° C. and 122 sec$^{-1}$ is preferably 20000 poise or less, more preferably 18000 poise or less, and even more preferably 17000 poise or less. If the melt viscosity of the (meth)acrylic resin composition is more than 20000 poise, the molding processability deteriorates, and, thus, a fine film may not be obtained. In the present invention "molding processability" refers to the properties with which fine molding can be performed easily while suppressing defects such as transfer failures, silver streaks, fish eyes, die lines, thickness unevenness, foaming, and the like, when a resin is formed into a film using melt-extrusion methods, such as melt-extrusion film molding, blow molding, or the like. Here, if the melt viscosity is less than 5000 poise, a film may be difficult to take up.

In the present invention, "melt viscosity" refers to flow properties in a state where a thermoplastic resin is melted by heat, as a ratio between the shear stress and the shear rate. The melt viscosity is obtained by measuring melt viscosity at a shear rate of 122 sec$^{-1}$ and a temperature of 260° C., as defined in JIS K7199, using a capillary having a size of 1 mm in diameter×10 mm in length in a Capilograph manufactured by Toyo Seiki Seisaku-Sho, Ltd. (unit: poise).

The melt viscosity of the acrylic-based resin composition of the present invention can be adjusted based on the following viewpoints. That is to say, in the (meth)acrylic-based resin (C), the melt viscosity tends to be higher as (1) the grafting ratio is higher and (2) the weight-average molecular weight, Mw, of a polymer obtained from the monomer mixture (A) is larger. Also, (3) the melt viscosity, in the monomer of the monomer mixture (A), tends to be lower when using tertiary-butyl acrylate compared with when using tertiary-butyl methacrylate, and (4) the melt viscosity tends to be lower when reducing the content ratio of methyl methacrylate and increasing the content ratio of an alkyl acrylate, such as methyl acrylate, ethyl acrylate, butyl acrylate, or the like.

Conversely, in the case where a methacrylic-based resin is used together as the thermoplastic resin (D), (1) the melt viscosity tends to be higher as the weight-average molecular weight Mw is larger, and (2) the melt viscosity tends to be lower when reducing the content ratio of methyl methacrylate and increasing the content ratio of an alkyl acrylate, such as methyl acrylate, ethyl acrylate, butyl acrylate, or the like.

It is preferable that the acid value of the acrylic resin composition falls within the above-described range.

The (meth)acrylic resin composition of the present invention has a glass transition point of preferably 110 to 140° C., and more preferably 115 to 135° C. It is preferable that the (meth)acrylic resin composition has a glass transition point of 110 to 140° C. in view of the molding processability and thermal resistance.

In the present invention, "to imidize using an ammonia-based compound" refers to a process of bringing an ammonia-based compound into contact with a (meth)acrylic resin composition with the application of heat so as to cause a reaction, thereby forming a glutarimide structure shown in Constitutional Formula (1) in the resin. A film obtained from an imidized (meth)acrylic resin obtained through this reaction can have further improved chemical resistance and, in particular, sun-screening agent resistance.

Constitutional Formula (1)

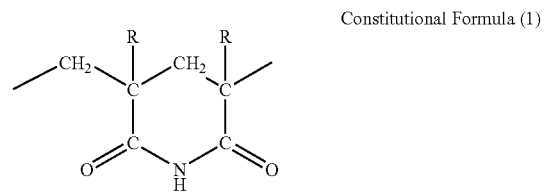

(where R is hydrogen or a methyl group.)

In the present invention, the imidization reaction can be caused, for example, using the following method, using the (meth)acrylic resin composition after the above-described heating treatment as a starting material.

That is to say, the imidization reaction can be obtained by (1) using an extruder or the like, to react the (meth)acrylic resin composition in a melted state with an ammonia-based compound (successive reactions), (2) using a solvent that can dissolve the (meth)acrylic resin composition and is non-reactive with an ammonia-based compound, to react the (meth)acrylic resin composition in the form of a solution with the ammonia-based compound (batch-type reactions).

Examples of the ammonia-based compound that can be used in the present invention include ammonia, and compounds that can form ammonia through the application of heat, such as urea, ammonium carbonate, and the like.

The ammonia-based compound used in the present invention may be introduced to the reaction system in any form, and the form may be a gas form, a solid form, or a form dissolved in a dispersion medium.

Preferable examples of the dispersion medium that can dissolve the ammonia-based compound of the present invention include water, and alcohols, such as methanol, ethanol, and the like.

There is no particular limitation on the imidization, as long as an imidized (meth)acrylic resin composition can be obtained. After heating to form a carboxylic acid group is performed and a (meth)acrylic resin composition is recovered, imidization may be performed using another apparatus. Alternatively, imidization may be performed successively using the same apparatus as in the heating.

In the case where an extruder is used, examples of the extruder include a single-screw extruder, a double-screw extruder, a multi-screw extruder, and the like. A double-screw extruder is particularly preferable as an extruder that can facilitate the mixing of ammonia with the (meth)acrylic resin composition. The double-screw extruder may be of a non-intermeshing co-rotating type, an intermeshing co-rotating type, a non-intermeshing counter-rotating type, or an intermeshing counter-rotating type. An intermeshing co-rotating extruder is preferable because it can rotate at a high speed, and can facilitate the mixing of the ammonia-based compound with the (meth)acrylic resin composition. These extruders may be used alone or in series.

In the case where imidization is performed inside an extruder, for example, after a (meth)acrylic resin composition is loaded from a starting material-loading portion of the extruder, the resin is melted and fills the cylinder. Then, an adding pump is used to add the ammonia-based compound into the extruder, and, thus, the imidization reaction can progress in the extruder.

In this case, the temperature in the reaction zone (resin temperature) in the extruder is preferably 230° C. to 320° C. It is preferable that the temperature in the reaction zone (resin temperature) is 230 to 320° C. in view of the imidization reaction speed, the thermal resistance, the chemical resistance, and the folding resistance of a film. Here, "reaction zone in the extruder" refers to a zone from the inlet position of the ammonia-based compound to the outlet opening (die portion) of the resin in the cylinder of the extruder.

The resin pressure in the extruder is preferably atmospheric pressure to 50 MPa, and more preferably 1 MPa to 30 MPa. It is preferable that the resin pressure is atmospheric pressure to 50 MPa, for example, because the dissolubility of the ammonia-based compound is good and operation can be performed within a tolerable pressure range for ordinary extruders.

In the case where an extruder is used, in order to remove unreacted ammonia-based compounds and byproducts, the extruder preferably has a vent-port that can reduce the pressure to atmospheric pressure or lower.

In the imidization of the present invention, for example, a reactor that can be used for highly viscous materials, such as a horizontal double-screw reactor, such as a BIVOLAK, or a vertical double-screw agitation vessel, such as a SUPERBLEND, manufactured by Sumitomo Heavy Industries, Ltd.; also preferably can be used instead of the extruder.

There is no particular limitation on a batch-type reaction vessel (pressure vessel) for production via a batch-type reaction, as long as a solution in which the (meth)acrylic resin composition is dissolved can be heated and agitated, and the ammonia-based compound can be added, but it is preferable to use a reaction vessel having good agitating efficiency because the viscosity of the polymer solution may increase as the reaction progresses. Examples thereof include an agitation vessel MAXBLEND manufactured by Sumitomo Heavy Industries, Ltd., and the like. Examples of a non-reactive solvent for the imidization reaction include: aliphatic alcohols, such as methyl alcohol, ethyl alcohol, propyl alcohol, isopropyl alcohol, butyl alcohol, and isobutyl alcohol; dimethylacetamide and dimethylformamide; dimethylsulfoxide; benzene, toluene, xylene, chlorobenzene and chlorotoluene; ether-based compounds; and the like. These solvents may be used alone or in a combination of two or more types. Of these, dimethylacetamide and a mixed solvent of toluene and methyl alcohol are preferable.

In the present invention, the ammonia-based compound and the (meth)acrylic resin composition are reacted preferably for 30 minutes or less, and more preferably for 20 minutes or less. If the reaction time is longer than 30 minutes, decomposition of the resin occurs based on its thermal history, and the yellowness index of the imidized (meth)acrylic resin composition tends to increase.

In the present invention, the amount of ammonia-based compound added may be changed as appropriate according to the imidization ratio of the imidized (meth)acrylic resin composition for developing necessary physical properties, but it is typically 5 to 60 parts by weight with respect to 100 parts by weight of the (meth)acrylic resin composition.

In the present invention, the imidization ratio of the imidized (meth)acrylic resin composition is preferably 1% or more, and more preferably 5% or more, in view of the chemical resistance.

Also, if necessary, a carboxyl group or the like in the imidized (meth)acrylic resin composition formed as a byproduct during the imidization reaction may be converted into an ester group or the like using an esterifying agent or the like.

In the present invention, when the (meth)acrylic resin composition is imidized by the ammonia-based compound, commonly used agents such as: weather resistance stabilizers, such as antioxidants, thermal stabilizers, light stabilizers, ultraviolet absorbers, radical scavengers; catalysts; plasticizers; lubricants; antistatic agents; colorants; shrinkage inhibitors; antibacterial and deodorizing agents; and the like may be added alone or in a combination of two or more types, within a range that does not impair the objects of the present invention. Also, these additives may be added when molding an imidized (meth)acrylic resin composition.

When the heating of the present invention is performed and a carboxylic acid group is formed in the (meth)acrylic resin composition, the imidization reactivity of the resin composition towards the ammonia-based compound is significantly improved, and a product having a high reaction yield can be obtained. Also, the heating time during the imidization reaction can be reduced compared with that in conventional cases and the yellowness index can be controlled to a low value. Accordingly, an imidized (meth)acrylic resin composition can be obtained in which both the chemical resistance and the colorless transparency can be improved.

The imidized (meth)acrylic resin composition of the present invention has a glass transition point of preferably 110° C. or higher, and more preferably 120° C. or higher. If the imidized (methacrylic resin composition has a glass transition point of lower than 110° C., for example, a molded product or a film obtained by melting the resin at a high temperature tends to be deformed easily.

A (meth)acrylic resin composition or an imidized (meth)acrylic resin composition obtained in the present invention can be formed into various molded products using various plastic treatment methods, such as injection molding, extrusion molding, blow molding, compression molding, or the like.

A (meth)acrylic resin composition or an imidized (meth)acrylic resin composition obtained in the present invention is useful, in particular, as a film and has good processability when using ordinary melt-extrusion methods, such as an inflation method or T-die extrusion method, a calendaring method, a solvent casting method, or the like. Also, if necessary, when a film is molded from the (meth)acrylic resin composition or the imidized (meth)acrylic resin composition, both faces of the film are brought simultaneously into contact with rollers or metal belts and, in particular, are simultaneously brought into contact with rollers or metal belts heated to the glass transition point or higher, so that a film having better surface properties can be obtained. Also, according to the purpose, the quality of the film can be changed by lamination molding or biaxial stretching.

A film obtained from the (meth)acrylic resin composition or the imidized (meth)acrylic resin composition of the present invention can be used to laminate a metal, a plastic, or the like. Examples of a lamination method include wet lamination in which, after an adhesive is applied to a metal plate such as a steel plate, a film is placed on the metal plate and the adhesive is dried so that the film and the metal plate are attached, dry lamination, extrusion lamination, hot melt lamination, and the like.

Examples of a method for laminating a film on a plastic part include: film insert molding in which a film is placed in a die and the die is filled with a resin by injection molding, lamination injection press molding, film in-mold molding in which a film preform is placed in a die and the die is filled with a resin by injection molding, and the like.

A molded product obtained from the (meth)acrylic resin composition or the imidized (meth)acrylic resin composition of the present invention can be used, for example, in: shooting lenses, finders, filters, prisms, and Fresnel lenses for cameras, VTRs, and projectors in the imaging field; pick-up lenses for the optical disks of CD players, DVD players, and MD players in the lens field; components for the optical disks of CD players, DVD players, and MD players in the optical recording field; light-guiding plates for liquid crystal, liquid crystal display films such as polarizer-protecting films and phase-difference films, and surface-protecting films in the information apparatus field; optical fibers, optical switches, optical connectors in the optical communication field; vehicle headlights, tail lamp lenses, inner lenses, instrument covers, sunroofs in the vehicle field; glasses, contact lenses, lenses for endoscopes, and other medical devices that need to be sterilized in the medical equipment apparatus field; road light-blocking plates, lenses for double glazing, lighting windows, carports, lenses for illumination, covers for illumination, sizing for building materials in the architecture and building material field; containers (dishes) for cooking in microwave ovens; housings for household electric appliance; toys; sunglasses; stationery; and the like.

Conversely, a laminated product of the films obtained from the (meth)acrylic resin composition or the imidized (meth)acrylic resin composition of the present invention can be used in vehicle interior or exterior materials, convenience goods, wall papers, coating substitutes, housings for furniture and electrical equipment, housings for OA equipment such as facsimile machines, floor materials, components for electrical or electronic apparatuses, bathroom facilities, and the like.

The present invention is not limited to the foregoing embodiments, and various modifications are possible within the scope disclosed in the claims. An embodiment obtained through appropriately combining the technical means disclosed in the different embodiments is encompassed within the technical scope of the present invention.

EXAMPLES

Hereinafter, the present invention will be described in more detail by way of examples and comparative examples, but the present invention is not limited to these.

In the following production examples, examples, and comparative examples, "parts" represents parts by weight, "%" represents wt %, and the symbols respectively represent the following materials.

BA: butyl acrylate
MA: methyl acrylate
MMA: methyl methacrylate
EHA: 2-ethylhexyl acrylate
tBuMA: tertiary-butyl methacrylate
tBuA: tertiary-butyl acrylate
MAA: methacrylic acid
ALMA: allyl methacrylate
CHP: cumene hydroperoxide
tDM: tertiary-dodecyl mercaptan The methods for measuring the physical properties in the following examples and comparative examples are as follows.

(1) Evaluation of Monomer-to-Polymer Conversion Ratio

The obtained (meth)acrylic-based resin (C) latex was dried in a hot-air dryer at 120° C. for 1 hour, and the solid content was obtained. The monomer-to-polymer conversion ratio was calculated using the equation: monomer-to-polymer conversion ratio (%)=100×solid content/amount of monomer loaded.

(2) Evaluation of Average Latex Particle Size

The volume-average particle size ($\mu m$) of the obtained (meth)acrylic-based resin (C) latex was measured by a light scattering method with a MICROTRAC UPA150 manufactured by Leed & Northrup Instruments.

(3) Measurement of Acid Value

The acid value was measured following the procedure below.

1) Titration of resin: After 0.3 g of obtained resin pellet was dissolved in 37.5 ml of methylene chloride, 37.5 ml of methanol was added. Two droplets of phenolphthalein/ethanol solution (1 wt %) were added to this solution. Then, 5 ml of 0.1N aqueous sodium hydroxide solution was added, and the mixture was agitated for 1 hour. To this solution, 0.1N hydrochloric acid was added dropwise, and the amount of 0.1N hydrochloric acid added dropwise, A (ml), by the time the purplish red color of the solution disappeared was measured.

2) Titration of blank: Two droplets of phenolphthalein/ethanol solution (1 wt %) were added to 37.5 ml of methylene chloride and 37.5 ml of methanol. Then, 5 ml of 0.1N aqueous sodium hydroxide solution was added thereto. To this solution, 0.1N hydrochloric acid was added dropwise, and the amount of 0.1N hydrochloric acid added dropwise, B (ml), by the time the purplish red color of the solution disappeared was measured.

3) The acid value in the resin (the total amount of acid and acid anhydride), C (mmol/g) was calculated using the following equation.

$$C=0.1\times(5-A-B)/0.3$$

(4) Measurement of Imidization Ratio

The imidization ratio was measured using a $^1$H-NMR spectrometer (Gemini-300 manufactured by Varian). Here, the ratio of imidization by an ammonia-based compound was calculated based on the ratio between the main chain α-methyl proton-derived peak near 0.7 to 1.2 ppm and the N—H imide group proton-derived peak near 10.2 to 10.8 ppm. Also, the ratio of imidization by methylamine was calculated based on the ratio between the main chain α-methyl proton-derived peak near 0.7 to 1.2 ppm and the N—CH$_3$ imide group proton-derived peak near 3.0 to 3.5 ppm.

Here, "imidization ratio" refers to the ratio of imidocarbonyl groups amongst all of the carbonyl groups.

(5) Grafting Ratio

First, 1 g of (meth)acrylic-based resin (C) was dissolved in 40 ml of methyl ethyl ketone, and the solution was centrifuged using a centrifugal separator (CP60E manufactured by Hitachi Koki Co., Ltd.) at a rotational speed of 3000 rpm for 1 hour, and separated by decantation into methyl ethyl ketone-insoluble matter and soluble matter. The obtained methyl ethyl ketone-insoluble matter was taken as an acrylic acid ester-based crosslinked elastic body-containing grafted copolymer, and the grafting ratio was calculated using the following equation.

Grafting ratio (%)={(weight of methyl ethyl ketone-insoluble matter−weight of acrylic acid ester-based crosslinked elastic particle (B))/weight of acrylic acid ester-based crosslinked elastic particle (B)}×100

(6) Glass Transition Point (Tg)

The glass transition point was determined using a midpoint method by way of measurement using 10 mg of obtained resin pellet with a differential scanning calorimeter DSC (DSC-50 manufactured by Shimadzu Corporation) under a nitrogen atmosphere at a temperature-increase rate of 20° C./min.

(7) Folding Resistance and Whitening-Upon-Folding Resistance

The obtained (meth)acrylic resin composition or imidized (meth)acrylic resin composition was molded using a T-die-equipped 40 mmϕ extruder at a cylinder temperature of 260° C. and a die temperature of 260° C., and a film having a thickness of 125 μm was obtained.

The obtained film was folded by 180 degrees, and the change in the folded portion was evaluated visually.

Good: Whitening was not confirmed in the folded portion.
Bad: Whitening was confirmed in the folded portion.
Very Bad: Cracking occurred in the folded portion.

(8) Chemical Resistance

The chemical resistance was evaluated using the film obtained in (7). Here, in the case of an imidized (meth)alkyl resin composition imidized using an autoclave, the evaluation was performed using a 250 μm-thick sheet obtained by press-molding the resin using a press machine (37tFS molding machine manufactured by Fujikiko) at a temperature of 220° C. and a pressure of 50 MPa for five minutes.

Toluene Resistance

One droplet (0.02 g) of toluene was added dropwise to the film obtained in (7) or the above-described sheet, and the obtained material was allowed to stand at room temperature until the toluene had dried up. Change in the portion to which the droplet was added was observed visually.

Good: No change was confirmed.
Fair: A slight trace of the droplet was confirmed.
Bad: Deterioration and color change in the resin were confirmed.

Xylene Resistance

One droplet (0.02 g) of xylene was added dropwise to the film obtained in (7) or the above-described sheet, and the obtained material was allowed to stand at room temperature until the xylene had dried up. Change in the portion to which the droplet was added was observed visually.

Good: No change was confirmed.
Fair: A slight trace of the droplet was confirmed.
Bad: Deterioration and color change in the resin were confirmed.

Sun-Screening Agent Resistance (Coppertone (Registered Trademark) Resistance) (Test method 1)

A small amount of sun-screening agent (Coppertone Water Babies Lotion SPF50) was applied to the film obtained in (7) or the above-described sheet, gauze was placed firmly thereon, and 500 g of weight was applied. After allowing it to stand for 1 hour at room temperature without any further treatment, heating was performed using an oven at 74° C., 64° C., or 54° C. for 1 hour, and the attached sun-screening agent was wiped off with gauze. Change in the application portion was visually observed Good: No change was confirmed.
Fair: A slight trace of the droplet was confirmed.
Bad: Deterioration and color change in the resin were confirmed.

Sun-Screening Agent Resistance (Coppertone (Registered Trademark) Resistance) (Test Method 2)

One droplet (0.005 g) of sun-screening agent (Coppertone Water Babies Lotion SPF50) was added dropwise to the film obtained in (7) or the above-described sheet, and spread using a brush over a section having a size of 2×3 cm. After allowing it to stand at 90° C. for 24 hours, the attached sun-screening agent was wiped off with gauze. Change in the application portion was observed visually.

Good: No change was confirmed.
Fair: A slight trace of the droplet was confirmed.
Bad: Deterioration and color change in the resin were confirmed.

Alkali Resistance

The film obtained in (7) was immersed in 0.1M aqueous sodium hydroxide solution, and the obtained material was allowed to stand at 55° C. for 4 hours. Change in the test piece was observed visually.

Good: No change was confirmed.
Fair: Slight deterioration was confirmed.
Bad: Deterioration and color change in the resin were confirmed.

(9) Yellowness Index

The film obtained in (7) or the sheet obtained in (8) was cut into a test piece having a size of 50 mm×50 mm, and measurement was performed using a spectroscopic color-difference meter SE-2000 manufactured by Nippon Denshoku Industries Co., Ltd., using the method as defined in JIS K7105-1981, 6.3. Here, the yellowness index of the sheet obtained in (8) was used after being converted into a value for a thickness of 125 μm.

(10) Unevenness of Film Thickness

The film obtained in (7) was cut into a sample having a size of 300 mm in the transverse direction (TD)×50 mm in machine direction (MD), and the thickness of the overall width in the TD direction was measured using a contact-type continuous thickness meter (KB601B manufactured by Anritsu Corporation).

Based on the measured thickness, the unevenness of a target film thickness of 125 μm was obtained using the following equation.

Unevenness of film thickness=|maximum thickness−minimum thickness|/2

(11) Visual Inspection of Film

The film obtained in (7) was cut into two samples each having a size of 500 mm in the TD direction×500 mm in the MD direction. The samples were irradiated with light from a desk stand (SQ948H manufactured under the brand name National, fluorescent light 27 W) in a dark room, and whether or not die line or foaming was present in the films was evaluated visually.

Production Example 1-1

Production of (Meth)Acrylic-Based Resin (C)

The following substances were loaded into an agitator-equipped 8 L polymerizer.

| | |
|---|---|
| Deionized water | 200 parts |
| Dioctyl sodium sulfosuccinate | 0.25 parts |
| Sodium formaldehyde sulphoxylate | 0.15 parts |
| Ethylenediaminetetraacetic acid disodium | 0.005 parts |
| Ferrous sulfate | 0.0015 parts |

After the internal portion of the polymerizer was purified sufficiently with nitrogen gas so that oxygen was not substantially present, the internal temperature was set to 60° C., and 20 parts of the monomer mixture functioning as the starting material of the acrylic acid ester-based crosslinked elastic particle (B) shown in C1-1 in Table 1 (i.e., a monomer mixture comprising 2.1 parts of AlMA and 0.2 parts of CHP with respect to 100 parts of a monomer mixture comprising 90% of BA and 10% of MMA) were added continuously at a rate of 10 parts/hour. After the addition, the polymerization was allowed to continue for 0.5 hours, and an acrylic acid ester-based crosslinked elastic particle (B) was obtained. The monomer-to-polymer conversion ratio was 99.5%, and the average particle size was 800 Å.

Then, after 0.3 parts of dioctyl sodium sulfosuccinate were loaded, the internal temperature was set to 60° C., and 80 parts of the monomer mixture (A) shown in C1-1 in Table 1 (i.e., a monomer mixture comprising 0.34 parts of tDM and 0.34 parts of CHP with respect to 100 parts of a monomer mixture comprising 20% of tBuMA and 80% of MMA) were continuously added at a rate of 10 parts/hour. The polymerization was allowed to continue for 1 hour, and a (meth) acrylic-based resin (C) was obtained. The monomer-to-polymer conversion ratio was 99.0%.

The obtained latex was extracted by salt formation with an aqueous calcium chloride solution, coagulated, washed with water and dried, and a resin powder C1-1 of the (meth) acrylic-based resin (C) was obtained.

Production Examples 1-2 to 1-5

Polymerization was performed as in Production Example 1-1 using the constituent materials of the acrylic acid ester-based crosslinked elastic particles (B) and the monomer mixtures (A) shown in C1-2 to C1-5 in Table 1, the obtained materials were coagulated, washed with water and dried, and resin powders C1-2 to C1-5 of the (meth)acrylic-based resin (C) were obtained.

Comparative Production Example 1-1

Polymerization was performed as in Production Example 1-1 using the constituent materials of the acrylic acid ester-based crosslinked elastic particle (B) and the monomer mixture (A) shown in C1-6 in Table 1, the obtained material was coagulated, washed with water and dried, and a resin powder C1-6 of the (meth)acrylic-based resin (C) not containing a tBuMA group or tBuA group was obtained.

TABLE 1

| | | Prod. Ex. | | | | | Com. Prod. Ex. |
|---|---|---|---|---|---|---|---|
| | | 1-1 | 1-2 | 1-3 | 1-4 | 1-5 | 1-1 |
| (Meth)acrylic-based resin (C) | | C1-1 | C1-2 | C1-3 | C1-4 | C1-5 | C1-6 |
| Acrylic acid ester-based crosslinked elastic particle (B) | Parts by weight | 20 | 20 | 20 | 30 | 30 | 20 |
| | BA (%) | 90 | 90 | 90 | 90 | 60 | 90 |
| | EHA (%) | 0 | 0 | 0 | 0 | 30 | 0 |
| | MMA (%) | 10 | 10 | 10 | 10 | 10 | 10 |
| | AlMA (parts) | 2.1 | 2.1 | 2.1 | 2.1 | 2.5 | 2.1 |
| | CHP (parts) | 0.2 | 0.2 | 0.2 | 0.2 | 0.2 | 0.2 |
| Monomer mixture (A) | Parts by weight | 80 | 80 | 80 | 70 | 70 | 80 |
| | MMA (%) | 80 | 75 | 90 | 89 | 89 | 100 |
| | tBuMA (%) | 20 | 20 | 10 | 11 | 0 | 0 |
| | tBuA (%) | 0 | 0 | 0 | 0 | 11 | 0 |
| | BA (%) | 0 | 5 | 0 | 0 | 0 | 0 |
| | tDM (parts) | 0.34 | 0.34 | 0.34 | 0.3 | 0.3 | 0.34 |
| | CHP (parts) | 0.34 | 0.34 | 0.34 | 0.3 | 0.3 | 0.34 |

Examples 1 to 3 and Comparative Example 1

The resin powders C1-1 to C1-3 and C1-6 of the (meth) acrylic-based resin (C) were melt-kneaded using a vented 40 mmφ single-screw extruder in which the cylinder temperature was set to 260° C., and resin pellets of the (meth)acrylic resin compositions (1) to (3) and (6) were obtained. Here, in the NMR measurement of the (meth)acrylic resin compositions (1) to (3), the peak derived from a tertiary-butyl group near 1.3 to 1.5 ppm had disappeared, confirming that a desorption reaction had progressed.

The properties of the obtained (meth)acrylic resin compositions were evaluated. The results together with the acid values of the (meth)acrylic resin compositions are shown in Table 2.

It was confirmed by acid value measurement that a carboxylic acid group was present in the (meth)acrylic resin compositions (1) to (3) obtained by heating the resin powders C1-1 to C1-3 of the (meth)acrylic-based resin (C) containing a tBuMA group. Although there were variations depending on the constituent materials of the (meth)acrylic-based resin (C), the (meth)acrylic resin compositions (1) to (3) containing a carboxylic acid group had improved xylene resistance and Coppertone resistance compared with those of the (meth) acrylic resin composition (6) not containing a carboxylic acid group.

Example 4

With respect to 100 parts of the resin powder C1-4 of the (meth)acrylic-based resin (C), 50 parts of the methacrylic-based resin SUMIPEX LG (manufactured by Sumitomo Chemical Co., Ltd., acid value=0 mmol/g) were blended, and the mixture was melt-kneaded using a vented 40 mmφ single-screw extruder in which the cylinder temperature was set to 260° C., and resin pellets of the (meth)acrylic resin compositions (4) and (5) were obtained. Here, in the NMR measurement of the (meth)acrylic resin composition (4), the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 2.

It was confirmed by acid value measurement that a carboxylic acid group was present in the (meth)acrylic resin composition (4) obtained by blending the resin powder C1-4 of the (meth)acrylic-based resin (C) containing a tBuMA group or tBuA group and the above-mentioned resin and then heating the mixture. The (meth)acrylic resin composition (4) containing a carboxylic acid group had improved xylene resistance and Coppertone resistance compared with those of the (meth)acrylic resin composition (6) not containing a carboxylic acid group.

Example 5

With respect to 100 parts of the resin powder C1-5 of the (meth)acrylic-based resin (C), 50 parts of the methacrylic-based resin HT121 (manufactured by ALTUGLASS, acid value=0.45 mmol/g) were blended, and the mixture was melt-kneaded using a vented 40 mmφ single-screw extruder in which the cylinder temperature was set to 260° C., and resin pellets of the (meth)acrylic resin composition (5) were obtained. Here, in the NMR measurement of the (meth)acrylic resin composition (5), the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 2.

It was confirmed by acid value measurement that a carboxylic acid group was present in the (meth)acrylic resin composition (5) obtained by blending the resin powder C1-5 of the (meth)acrylic-based resin (C) containing a tBuMA group or tBuA group and the above-mentioned resin and then heating the mixture. The (meth)acrylic resin composition (5) containing a carboxylic acid group had improved xylene resistance and Coppertone resistance compared with those of the (meth)acrylic resin composition (6) not containing a carboxylic acid group.

material of the acrylic acid ester-based crosslinked elastic particle (B) shown in C2-1 in Table 3 (i.e., a monomer mixture comprising 2.1 parts of AlMA and 0.2 parts of CHP with respect to 100 parts of a monomer mixture comprising 90% of BA and 10% of MMA) were added continuously at a rate of 10 parts/hour. After the addition, the polymerization was allowed to continue for 0.5 hours, and an acrylic acid ester-based crosslinked elastic particle (B) was obtained. The monomer-to-polymer conversion ratio was 99.5%, and the average particle size was 800 Å. Then, after 0.3 parts of dioctyl sodium sulfosuccinate were loaded, the internal temperature was set to 60° C., and 80 parts of the monomer mixture (A) shown in C2-1 in Table 3 (i.e., a monomer mixture comprising 0.34 parts of tDM and 0.34 parts of CHP with respect to 100 parts of a monomer mixture comprising 10% of tBuA and 90% of MMA) were added continuously at a rate of 10 parts/hour. The polymerization was allowed to continue for 1 hour, and a (meth)acrylic-based resin (C) was obtained. The monomer-to-polymer conversion ratio was 99.0%. The obtained latex was extracted by salt formation with an aqueous magnesium sulfate solution, coagulated, washed with

TABLE 2

|  |  | Ex. | | | | | Com. Ex. |
| --- | --- | --- | --- | --- | --- | --- | --- |
|  |  | 1 | 2 | 3 | 4 | 5 | 1 |
| (Meth)acrylic resin composition | | (1) | (2) | (3) | (4) | (5) | (6) |
| (Meth)acrylic-based resin (C) | | C1-1 | C1-2 | C1-3 | C1-4 | C1-5 | C1-6 |
| Blend resin | Resin type | — | — | — | LG | HT121 | — |
| | Amount blended (parts) | — | — | — | 43 | 43 | — |
| Heating temperature (° C.) | | 260 | 260 | 260 | 260 | 260 | 260 |
| Acid value (mmol/g) | | 1.01 | 1.01 | 0.54 | 0.34 | 0.57 | 0 |
| Tg (° C.) | | 135 | 123 | 132 | 125 | 128 | 119 |
| Xylene resistance | | Good | Good | Good | Fair | Good | Bad |
| Toluene resistance | | Fair | Bad | Fair | Bad | Bad | Bad |
| Coppertone resistance (Test method 1) | 74° C. | Bad | Bad | Bad | Bad | Bad | Bad |
| | 64° C. | Bad | Bad | Bad | Bad | Bad | Bad |
| | 54° C. | Fair | Fair | Fair | Bad | Fair | Bad |
| Coppertone resistance (Test method 2) | | Good | Good | Good | Good | Good | Bad |
| Yellowness index | | 1.1 | 0.8 | 0.6 | 1.1 | 1.1 | 1.0 |
| Whitening-upon-folding resistance | | Good | Good | Good | Good | Good | Good |

The amount of blend resin blended is shown in parts with respect to 100 parts of the (meth)acrylic-based resin (C).
LG: SUMIPEX LG
HT121: ALTUGLAS HT121

Next, the alkali resistance of the (meth)acrylic resin composition will be examined.

Production Example 2-1

Production of (Meth)Acrylic-Based Resin (C)

The following substances were loaded into an agitator-equipped 8 L polymerizer.

| Deionized water | 200 parts |
| --- | --- |
| Dioctyl sodium sulfosuccinate | 0.25 parts |
| Sodium formaldehyde sulphoxylate | 0.15 parts |
| Ethylenediaminetetraacetic acid disodium | 0.005 parts |
| Ferrous sulfate | 0.0015 parts |

After the internal portion of the polymerizer was purified sufficiently with nitrogen gas so that oxygen was not substantially present, the internal temperature was set to 60° C., and 20 parts of the monomer mixture functioning as the starting water and dried, and a resin powder C2-1 of the (meth)acrylic-based resin (C) was obtained.

Production Examples 2-2 to 2-6

Polymerization was performed as in Production Example 2-1 using the constituent materials of the acrylic acid ester-based crosslinked elastic particles (B) and the monomer mixtures (A) shown in C2-2 to C2-6 in Table 3, the obtained materials were coagulated, washed with water and dried, and resin powders C2-2 to C2-6 of the (meth)acrylic-based resin (C) were obtained.

Comparative Production Example 2-1

Polymerization was performed as in Production Example 2-1 using the constituent materials of the acrylic acid ester-based crosslinked elastic particle (B) and the monomer mixture (A) shown in C2-7 in Table 3, the obtained material was coagulated, washed with water and dried, and a resin powder C2-7 of the (meth)acrylic-based resin (C) was obtained.

TABLE 3

|  |  | Prod. Ex. | | | | | | Com. Prod. Ex. |
|---|---|---|---|---|---|---|---|---|
|  |  | 2-1 | 2-2 | 2-3 | 2-4 | 2-5 | 2-6 | 2-1 |
| (Meth)acrylic-based resin (C) | | C2-1 | C2-2 | C2-3 | C2-4 | C2-5 | C2-6 | C2-7 |
| Acrylic acid ester-based crosslinked elastic particle (B) | Parts by weight | 20 | 20 | 30 | 30 | 20 | 30 | 20 |
| | BA (%) | 90 | 60 | 60 | 60 | 90 | 60 | 90 |
| | EHA (%) | 0 | 30 | 30 | 30 | 0 | 30 | 0 |
| | MMA (%) | 10 | 10 | 10 | 10 | 10 | 10 | 10 |
| | AlMA (parts) | 2.1 | 2.5 | 2.5 | 2.5 | 2.1 | 2.5 | 2.1 |
| | CHP (parts) | 0.2 | 0.2 | 0.2 | 0.2 | 0.2 | 0.2 | 0.2 |
| Monomer mixture (A) | Parts by weight | 80 | 80 | 70 | 70 | 80 | 70 | 80 |
| | MMA (%) | 90 | 94 | 94 | 89 | 80 | 82 | 100 |
| | tBuA (%) | 10 | 6 | 6 | 11 | 20 | 18 | 0 |
| | tDM (parts) | 0.3 | 0.3 | 0.3 | 0.3 | 0.3 | 0.3 | 0.3 |
| | CHP (parts) | 0.3 | 0.3 | 0.3 | 0.3 | 0.3 | 0.3 | 0.3 |

Examples 6 and 7

The resin powder C2-1 or C2-2 of the (meth)acrylic-based resin (C) was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin compositions were evaluated. The results together with the acid values of the (meth)acrylic resin compositions are shown in Table 4.

In the (meth)acrylic resin compositions of Examples 6 and 7 in which the monomer compositions (A) contained 1 to 15 wt % of tertiary-butyl (meth)acrylate, and the acid value was 0.3 mmol/g or more and less than 0.7 mmol/g, all types of chemical resistance were improved.

Example 8

The resin powder C2-5 of the (meth)acrylic-based resin (C) was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 4.

In the (meth)acrylic resin composition of Example 8 in which more than 15 wt % of tertiary-butyl (meth)acrylate was contained, and the acid value was 0.7 mmol/g or more, the xylene resistance and the sun-screening agent resistance were excellent, but the alkali resistance was poor.

Comparative Example 2

The resin powder C2-7 of the (meth)acrylic-based resin (C) was melt-kneaded using a vented 40 mmφ single-screw extruder in which the cylinder temperature was set to 260° C., and resin pellets of the (meth)acrylic resin composition were obtained.

The properties of the obtained (meth)acrylic resin composition were evaluated. The results together with the acid value of the (meth)acrylic resin composition are shown in Table 4.

In the (meth)acrylic resin composition of Comparative Example 2 in which the monomer composition (A) did not contain tertiary-butyl (meth)acrylate, and the acid value was less than 0.3 mmol/g, the xylene resistance and the sun-screening agent resistance were poor.

TABLE 4

|  | Ex. | | | Com. Ex. |
|---|---|---|---|---|
|  | 6 | 7 | 8 | 2 |
| (Meth)acrylic-based resin (C) | C2-1 | C2-2 | C2-5 | C2-7 |
| Heating temperature (° C.) | 260 | 260 | 260 | 260 |
| Acid value (mmol/g) | 0.61 | 0.31 | 0.89 | 0 |
| Tg (° C.) | 123 | 120 | 135 | 118 |
| Xylene resistance | Good | Good | Good | Bad |
| Alkali resistance | Good | Good | Bad | Good |
| Coppertone resistance (Test method 2) | Good | Good | Good | Bad |
| Yellowness index | 1.1 | 1.1 | 1.0 | 1.0 |
| Whitening-upon-folding resistance | Good | Good | Good | Good |

Example 9

With respect to 100 parts by weight of the resin powder C2-3 of the (meth)acrylic-based resin (C), 30 parts of the methacrylic-based resin HT121 (manufactured by ALTUGLASS, acid value 0.45 mmol/g) were blended, the mixture was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 9 in which the monomer composition (A) contained 1 to 15 wt % of tertiary-butyl (meth)acrylate, and the acid value was 0.3 mmol/g or more and less than 0.7 mmol/g, all types of chemical resistance were improved.

Example 10

With respect to 100 parts by weight of the resin powder C2-4 of the (meth)acrylic-based resin (C), 30 parts of the methacrylic-based resin SUMIPEX LG (manufactured by Sumitomo Chemical Co., Ltd., acid value 0 mmol/g) were blended, the mixture was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 10 in which the monomer composition (A) contained 1 to 15 wt % of tertiary-butyl (meth)acrylate, and the acid value was 0.3 mmol/g or more and less than 0.7 mmol/g, all types of chemical resistance were improved.

Example 11

With respect to 100 parts by weight of the resin powder C2-4 of the (meth)acrylic-based resin (C), 30 parts of the methacrylic-based resin HT121 (acid value 0.45 mmol/g) were blended, the mixture was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 11 in which the monomer composition (A) contained 1 to 15 wt % of tertiary-butyl (meth)acrylate, and the acid value was 0.3 mmol/g or more and less than 0.7 mmol/g, all types of chemical resistance were improved.

Example 12

With respect to 100 parts by weight of the resin powder C2-3 of the (meth)acrylic-based resin (C), 30 parts of the methacrylic-based resin SUMIPEX LG (acid value 0 mmol/g) were blended, the mixture was melt-kneaded using a vented 40 mmφ single-screw extruder in which the cylinder temperature was set to 260° C., and resin pellets of the (meth) acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 12 in which the monomer composition (A) contained 1 to 15 wt % of tertiary-butyl (meth)acrylate, but the acid value was less than 0.3 mmol/g, the sun-screening agent resistance was slightly poor.

Example 13

With respect to 100 parts by weight of the resin powder C2-6 of the (meth)acrylic-based resin (C), 30 parts of the methacrylic-based resin HT121 (acid value 0.45 mmol/g) were blended, the mixture was melt-kneaded using a vented 40 mmφ single-screw extruder in which the cylinder temperature was set to 260° C., and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 13 in which the monomer mixture (A) contained more than 15 wt % of tertiary-butyl (meth)acrylate, and the acid value was 0.7 mmol/g or more, the xylene resistance and the sun-screening agent resistance were excellent, but the alkali resistance was poor.

Example 14

With respect to 100 parts by weight of the resin powder C2-6 of the (meth)acrylic-based resin (C), 30 parts of the methacrylic-based resin SUMIPEX LG (acid value 0 mmol/g) were blended, the mixture was melt-kneaded using a vented 40 mmφ single-screw extruder in which the cylinder temperature was set to 260° C., and resin pellets of the (meth) acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 5.

In the (meth)acrylic resin composition of Example 14 in which the acid value was 0.3 mmol/g or more and less than 0.7 mmol/g, but the monomer mixture (A) contained more than 15 wt % of tertiary-butyl (meth)acrylate, the xylene resistance and the sun-screening agent resistance were excellent, but the alkali resistance was poor.

TABLE 5

|  |  | Ex. | | | | | |
| --- | --- | --- | --- | --- | --- | --- | --- |
|  |  | 9 | 10 | 11 | 12 | 13 | 14 |
| (Meth)acrylic-based resin (C) | | C2-3 | C2-4 | C2-4 | C2-3 | C2-6 | C2-6 |
| Blend | Resin type | HT121 | HT121 | LG | LG | HT121 | LG |
| resin | Acid value (mmol/g) | 0.45 | 0.45 | 0 | 0 | 0.45 | 0 |
|  | Amount blended (parts) | 43 | 43 | 43 | 43 | 43 | 43 |
|  | Heating temperature (° C.) | 260 | 260 | 260 | 260 | 260 | 260 |
|  | Acid value (mmol/g) | 0.41 | 0.56 | 0.41 | 0.16 | 0.81 | 0.58 |
|  | Tg (° C.) | 135 | 123 | 132 | 125 | 128 | 119 |

TABLE 5-continued

|  | Ex. | | | | | |
| --- | --- | --- | --- | --- | --- | --- |
|  | 9 | 10 | 11 | 12 | 13 | 14 |
| Xylene resistance | Good | Good | Good | Fair | Good | Good |
| Alkali resistance | Good | Good | Good | Good | Bad | Bad |
| Coppertone resistance (Test method 2) | Good | Good | Good | Fair | Good | Good |
| Yellowness index | 1.1 | 0.8 | 0.6 | 1.1 | 1.1 | 1.0 |
| Whitening-upon-folding resistance | Good | Good | Good | Good | Good | Good |

The amount of blend resin blended is shown in parts with respect to 100 parts of the (meth)acrylic-based resin (C).
LG: SUMIPEX LG (acid value = 0 mmol/g)
HT121: ALTUGLAS HT121 (acid value = 0.45 mmol/g)

Next, the melt viscosity of the (meth)acrylic resin composition will be examined.

Production Example 3-1

Production of (Meth)Acrylic-Based Resin (C)

The following substances were loaded into an agitator-equipped 8 L polymerizer.

| Deionized water | 200 parts |
| --- | --- |
| Dioctyl sodium sulfosuccinate | 0.25 parts |
| Sodium formaldehyde sulphoxylate | 0.15 parts |
| Ethylenediaminetetraacetic acid disodium | 0.005 parts |
| Ferrous sulfate | 0.0015 parts |

After the internal portion of the polymerizer was purified sufficiently with nitrogen gas so that oxygen was not substantially present, the internal temperature was set to 60° C., and 20 parts of the monomer mixture functioning as the starting material of the acrylic acid ester-based crosslinked elastic particle (B) shown in C3-1 in Table 6 (i.e., a monomer mixture comprising 3 parts of AlMA and 0.2 parts of CHP with respect to 100 parts of a monomer mixture comprising 60% of BA, 30% of EHA, and 10% of MMA) were added continuously at a rate of 10 parts/hour. After the addition, the polymerization was allowed to continue for 0.5 hours, and an acrylic acid ester-based crosslinked elastic particle (B) was obtained. The monomer-to-polymer conversion ratio was 99.5%, and the average particle size was 800 Å.

Then, after 0.3 parts of dioctyl sodium sulfosuccinate were loaded, the internal temperature was set to 60° C., and 80 parts of the monomer mixture (A) shown in C3-1 in Table 6 (i.e., a monomer mixture comprising 0.34 parts of tDM and 0.34 parts of CHP with respect to 100 parts of a monomer mixture comprising 11% of tBuA and 89% of MMA) were added continuously at a rate of 10 parts/hour. The polymerization was allowed to continue for 1 hour, and a (meth)acrylic-based resin (C) was obtained. The monomer-to-polymer conversion ratio was 99.0%. The obtained latex was extracted by salt formation with an aqueous magnesium sulfate solution, coagulated, washed with water and dried, and a resin powder C3-1 of the (meth)acrylic-based resin (C) was obtained.

Production Examples 3-2 to 3-9

Polymerization was performed as in Production Example 3-1 using the constituent materials of the acrylic acid ester-based crosslinked elastic particles (B) and the monomer mixtures (A) shown in C3-2 to C3-9 in Table 6, the obtained materials were coagulated, washed with water and dried, and resin powders C3-2 to C3-9 of the (meth)acrylic-based resin (C) were obtained.

Comparative Production Examples 3-1 to 3-4

Polymerization was performed as in Production Example 3-1 using the constituent materials of the acrylic acid ester-based crosslinked elastic particles (B) and the monomer mixtures (A) shown in C3-10 to C3-13 in Table 6, the obtained materials were coagulated, washed with water and dried, and resin powders C3-10 to C3-13 of the (meth)acrylic-based resin (C) were obtained.

TABLE 6

|  |  | Prod. Ex. | | | | | | | | | Com. Prod. Ex. | | | |
| --- | --- | --- | --- | --- | --- | --- | --- | --- | --- | --- | --- | --- | --- | --- |
|  |  | 3-1 | 3-2 | 3-3 | 3-4 | 3-5 | 3-6 | 3-7 | 3-8 | 3-9 | 3-1 | 3-2 | 3-3 | 3-4 |
| (Meth)acrylic-based resin (C) |  | C3-1 | C3-2 | C3-3 | C3-4 | C3-5 | C3-6 | C3-7 | C3-8 | C3-9 | C3-10 | C3-11 | C3-12 | C3-13 |
| Acrylic acid ester-based crosslinked elastic particle (B) | Parts by weight | 20 | 20 | 30 | 30 | 30 | 30 | 30 | 30 | 30 | 20 | 30 | 30 | 30 |
|  | BA (%) | 60 | 60 | 60 | 60 | 60 | 60 | 60 | 60 | 60 | 60 | 60 | 60 | 60 |
|  | EHA (%) | 30 | 30 | 30 | 30 | 30 | 30 | 30 | 30 | 30 | 30 | 30 | 30 | 30 |
|  | MMA (%) | 10 | 10 | 10 | 10 | 10 | 10 | 10 | 10 | 10 | 10 | 10 | 10 | 10 |
|  | AlMA (parts) | 3.0 | 3.0 | 3.0 | 3.0 | 3.0 | 1.8 | 2.8 | 2.8 | 3.4 | 3.0 | 3.0 | 3.0 | 3.0 |
|  | CHP (parts) | 0.2 | 0.2 | 0.2 | 0.2 | 0.2 | 0.2 | 0.2 | 0.2 | 0.2 | 0.2 | 0.2 | 0.2 | 0.2 |

TABLE 6-continued

| | | Prod. Ex. | | | | | | | | | Com. Prod. Ex. | | | |
|---|---|---|---|---|---|---|---|---|---|---|---|---|---|---|
| | | 3-1 | 3-2 | 3-3 | 3-4 | 3-5 | 3-6 | 3-7 | 3-8 | 3-9 | 3-1 | 3-2 | 3-3 | 3-4 |
| Monomer mixture (A) | Parts by weight | 80 | 80 | 70 | 70 | 70 | 70 | 70 | 70 | 70 | 80 | 70 | 70 | 70 |
| | MMA (%) | 89 | 83 | 83 | 77 | 72 | 89 | 89 | 89 | 89 | 100 | 100 | 78 | 78 |
| | tBuA (%) | 11 | 11 | 11 | 11 | 16 | 11 | 11 | 11 | 11 | 0 | 0 | 0 | 22 |
| | tBuMA (%) | 0 | 0 | 0 | 0 | 0 | 0 | 0 | 0 | 0 | 0 | 0 | 22 | 0 |
| | BA (%) | 0 | 6 | 6 | 12 | 12 | 0 | 0 | 0 | 0 | 0 | 0 | 0 | 0 |
| | MA (%) | 0 | 0 | 0 | 0 | 0 | 0 | 0 | 0 | 0 | 0 | 0 | 0 | 0 |
| | tDM (parts) | 0.34 | 0.34 | 0.34 | 0.34 | 0.34 | 0.34 | 0.34 | 0.27 | 0.34 | 0.34 | 0.34 | 0.34 | 0.34 |
| | CHP (parts) | 0.34 | 0.34 | 0.34 | 0.34 | 0.34 | 0.34 | 0.34 | 0.34 | 0.34 | 0.34 | 0.34 | 0.34 | 0.34 |

Examples 15 and 16

The resin powder C3-1 or C3-2 of the (meth)acrylic-based resin (C) was melt-kneaded using a vented 40 mmφ single-screw extruder in which the cylinder temperature was set to 265° C. and the pressure at two vent-ports was set to ±0.095 MPa, for a retention time of 1.5 minutes, and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin compositions were evaluated. The results together with the acid values and the melt viscosities of the (meth)acrylic resin compositions are shown in Table 7.

In the (meth)acrylic resin compositions of Examples 15 and 16 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Comparative Example 3

The resin powder C3-10 of the (meth)acrylic-based resin (C) was treated as in Example 15, and resin pellets of the (meth)acrylic resin composition were obtained.

The properties of the obtained (meth)acrylic resin composition were evaluated. The results together with the acid value of the (meth)acrylic resin composition are shown in Table 7.

In the (meth)acrylic resin composition of Comparative Example 3 in which the monomer composition (A) did not contain tertiary-butyl (meth)acrylate, the sun-screening agent resistance of the obtained film was poor.

TABLE 7

| | Ex. | | Com. Ex. |
|---|---|---|---|
| | 15 | 16 | 3 |
| (Meth)acrylic-based resin (C) | C3-1 | C3-2 | C3-10 |
| Heating temperature (° C.) | 265 | 265 | 265 |
| Melt viscosity (poise) | 18000 | 16500 | 15000 |
| Acid value (mmol/g) | 0.58 | 0.59 | 0 |
| Tg (° C.) | 123 | 117 | 113 |
| Grafting ratio (%) | 158 | 150 | 130 |
| Xylene resistance | Good | Good | Bad |
| Toluene resistance | Bad | Bad | Bad |
| Coppertone resistance (Test method 1) 74° C. | Bad | Bad | Bad |
| 64° C. | Bad | Bad | Bad |
| 54° C. | Fair | Fair | Bad |
| Coppertone resistance (Test method 2) | Good | Good | Bad |
| Whitening-upon-folding resistance | Good | Good | Good |
| Unevenness of film thickness (μm) | 1.9 | 1.6 | 1.4 |
| Visual inspection of film | No defect | No defect | No defect |

Example 17

With respect to 100 parts by weight of the resin powder C3-3 of the (meth)acrylic-based resin (C), 43 parts of the methacrylic-based resin HT121 (manufactured by ALTU-GLAS; MMA/MAA=96/4 (weight ratio: results of analysis obtained by $H^1$-NMR measurement), acid value=0.45 mmol/g, Mw=90000 (results of analysis obtained by gel permeation chromatograph (GPC)), Tg=127° C.) were blended, the mixture was treated as in Example 15, and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the melt viscosity and the acid value of the (meth)acrylic resin composition are shown in Table 8.

In the (meth)acrylic resin composition of Example 17 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Example 18

With respect to 100 parts by weight of the resin powder C3-4 of the (meth)acrylic-based resin (C), 43 parts of the methacrylic-based resin HT121 (acid value 0.45 mmol/g) were blended, the mixture was treated as in Example 15, and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic resin composition of Example 18 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Example 19

With respect to 100 parts by weight of the resin powder C3-5 of the (meth)acrylic-based resin (C), 43 parts of the methacrylic-based resin ACRYPET VH (manufactured by Mitsubishi Rayon Co., Ltd., MMA/MA=97/3 (weight ratio: results of analysis obtained by $H^1$-NMR measurement), acid value=0 mmol/g, Mw=130000 (results of analysis obtained by GPC), Tg=120° C.) were blended, the mixture was treated as in Example 15, and resin pellets of the (meth)acrylic resin composition were obtained. Also, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic resin composition of Example 19 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Example 20

With respect to 100 parts by weight of the resin powder C3-6 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic resin composition of Example 20 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Example 21

With respect to 100 parts by weight of the resin powder C3-7 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Here, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic resin composition of Example 21 in which the monomer composition (A) contained 1 to 20 wt % of tertiary-butyl (meth)acrylate, and the melt viscosity was 20000 poise or less, the sun-screening agent resistance and the film moldability of the obtained film were well balanced.

Example 22

With respect to 100 parts by weight of the resin powder C3-8 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Also, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

Example 23

With respect to 100 parts by weight of the resin powder C3-9 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Also, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

Comparative Example 4

With respect to 100 parts by weight of the resin powder C3-11 of the (meth)acrylic-based resin (C), 43 parts of the methacrylic-based resin SUMIPEX LG (manufactured by Sumitomo Chemical Co., Ltd., MMA/MA=93/7 (weight ratio: results of analysis obtained by $H^1$-NMR measurement), acid value=0 mmol/g, Mw=110000 (results of analysis obtained by GPC), Tg=105° C.) were blended, the mixture was treated as in Example 15, and resin pellets of the (meth) acrylic resin composition were obtained.

The properties of the obtained (meth)acrylic resin composition were evaluated. The results together with the acid value of the (meth)acrylic resin composition are shown in Table 8.

In the (meth)acrylic resin composition of Comparative Example 4 in which the monomer composition (A) did not contain tertiary-butyl (meth)acrylate, the sun-screening agent resistance of the obtained film was poor.

Comparative Example 5

With respect to 100 parts by weight of the resin powder C3-12 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Also, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic-based resin composition of Comparative Example 5 in which the melt viscosity was more than 20000 poise, the film moldability was poor.

Comparative Example 6

With respect to 100 parts by weight of the resin powder C3-13 of the (meth)acrylic-based resin (C), 43 parts of the methacrylic-based resin HT121 (acid value=0.45 mmol/g) were blended, the mixture was treated as in Example 15, and resin pellets of the (meth)acrylic resin composition were obtained. Also, in the NMR measurement of the obtained (meth)acrylic resin composition, the peak derived from a tertiary-butyl group near 1.3 to 1.5 ppm had disappeared, confirming that a desorption reaction had progressed.

The properties of the obtained (meth)acrylic resin composition were evaluated. The results together with the acid value of the (meth)acrylic resin composition are shown in Table 8.

In the (meth)acrylic resin composition of Comparative Example 6 in which the melt viscosity was more than 20000 poise, the film moldability was poor.

solution functioning as an imidizing agent, and an imidized (meth)acrylic resin composition was produced in the following manner.

That is to say, 5.0 g of (meth)acrylic resin composition (2), 1.0 g of 7N ammonia/methanol solution (20 parts with respect to 100 parts of (2)), and 25 ml of dimethylacetamide as a non-reactive solvent were placed in the autoclave, and a reaction was caused at a reaction temperature of 250° C. for a reaction time of 20 minutes. After being allowed to cool, the reacted mixture was added dropwise to methanol and deposited again, and filtering and drying were performed to recover the product.

Various properties of the obtained imidized (meth)acrylic resin composition were evaluated. The results together with the imidization ratio of the fluidized (meth)acrylic resin composition are shown in Table 9. Table 9 also shows the properties of the (meth)acrylic resin composition (2).

Example 25

An imidized (meth)acrylic resin composition was obtained as in Example 24, except that the type and the amount of imidizing agent were changed so that 1.5 g of ammonium carbonate (30 parts with respect to 100 parts of (2)) was used, and the reaction conditions were changed as shown in Table 9.

TABLE 8

| | | Ex. | | | | | | | Com. Ex. | | |
|---|---|---|---|---|---|---|---|---|---|---|---|
| | | 17 | 18 | 19 | 20 | 21 | 22 | 23 | 4 | 5 | 6 |
| (Meth)acrylic-based resin (C) | | C3-3 | C3-4 | C3-5 | C3-6 | C3-7 | C3-8 | C3-9 | C3-11 | C3-12 | C3-13 |
| Blend resin | Resin type | HT121 | HT121 | VH | HT121 | HT121 | HT121 | HT121 | LG | HT121 | HT121 |
| | Amount blended (parts) | 43 | 43 | 43 | 43 | 43 | 43 | 43 | 43 | 43 | 43 |
| Heating temperature (° C.) | | 265 | 265 | 265 | 265 | 265 | 265 | 265 | 265 | 265 | 265 |
| Melt viscosity (poise) | | 14900 | 13000 | 14000 | 14500 | 17000 | 19500 | 19500 | 13000 | 22000 | 21000 |
| Acid value (mmol/g) | | 0.56 | 0.57 | 0.41 | 0.57 | 0.58 | 0.57 | 0.56 | 0 | 0.98 | 1.12 |
| Tg (° C.) | | 120 | 116 | 112 | 126 | 127 | 126 | 127 | 113 | 138 | 132 |
| Grafting ratio (%) | | 135 | 133 | 128 | 90 | 135 | 136 | 155 | 130 | 130 | 133 |
| Xylene resistance | | Good | Good | Good | Good | Good | Good | Good | Bad | Good | Good |
| Toluene resistance | | Fair | Bad | Bad | Fair | Fair | Bad | Bad | Bad | Good | Good |
| Coppertone resistance (Test method 1) | 74° C. | Bad | Bad | Bad | Bad | Bad | Bad | Bad | Bad | Bad | Bad |
| | 64° C. | Bad | Bad | Bad | Bad | Fair | Bad | Bad | Bad | Fair | Fair |
| | 54° C. | Fair | Fair | Bad | Bad | Good | Bad | Bad | Bad | Fair | Bad |
| Coppertone resistance (Test method 2) | | Good | Good | Good | Good | Good | Good | Good | Bad | Good | Good |
| Whitening-upon-folding resistance | | Good | Good | Good | Bad | Good | Good | Good | Good | Good | Good |
| Unevenness of film thickness (μm) | | 2.2 | 1.5 | 1.6 | 1.6 | 1.9 | 2.5 | 2.6 | 1.4 | 3.5 | 3.2 |
| Visual inspection of film | | No defect | No defect | No defect | No defect | No defect | Slight die line | Slight die line | No defect | Die line | Die line |

The amount of blend resin blended is shown in parts with respect to 100 parts of the (meth)acrylic-based resin (C).
LG: SUMIPEX LG (MMA/MA = 93/7, acid value = 0 mmol/g, Mw = 110000, Tg = 105° C.)
VH: ACRYPET VH (MMA/MA = 97/3, acid value = 0 mmol/g, Mw = 130000, Tg = 120° C.)
HT121: ALTUGLAS HT121 (MMA/MAA = 95/5, acid value = 0.45 mmol/g, Mw = 90000, Tg = 127° C.)

Next, the imidization of the (meth)acrylic resin composition was examined.

Example 24

In a 50 ml autoclave having a pressure resistance of 10 MPa (manufactured by Taiatsu Techno Corporation), the (meth) acrylic resin composition (2) obtained by performing heating as in Example 2 was reacted with an ammonia/methanol Various properties of the obtained imidized (meth)acrylic resin composition were evaluated. The results together with the imidization ratio of the imidized (meth)acrylic resin composition are shown in Table 9.

Comparative Example 7

An imidized (meth)acrylic resin composition was obtained as in Example 25, except that the type of (meth)acrylic resin composition was changed to a composition (6) not containing a carboxylic acid group, and the reaction conditions were changed as shown in Table 9.

Various properties of the obtained imidized (meth)acrylic resin composition were evaluated. The results together with the imidization ratio of the imidized (meth)acrylic resin composition are shown in Table 9.

TABLE 9

|  |  | Ex. | | | Com. Ex. |
| --- | --- | --- | --- | --- | --- |
|  |  | 24 | 25 | Ref. | 7 |
| (Meth)acrylic resin composition | | (2) | (2) | (2) | (6) |
| Imidizing agent | Type | Ammonia/methanol solution | Ammonium carbonate | — | Ammonium carbonate |
|  | Amount (parts) | 20 | 30 | — | 30 |
| Reaction temperature (° C.) | | 250 | 250 | — | 250 |
| Reaction time (min) | | 20 | 20 | — | 180 |
| Imidization ratio (%) | | 30 | 35 | — | 8 |
| Acid value (mmol/g) | | 0.86 | 0.91 | 1.01 | 0.17 |
| Tg (° C.) | | 143 | 147 | 123 | 128 |
| Xylene resistance | | Good | Good | Good | Good |
| Toluene resistance | | Good | Good | Bad | Good |
| Coppertone resistance (Test method 1) | 74° C. | Fair | Fair | Bad | Bad |
|  | 64° C. | Good | Good | Bad | Bad |
|  | 54° C. | Good | Good | Fair | Fair |
| Coppertone resistance (Test method 2) | | Good | Good | Good | Fair |
| Yellowness index | | 1.3 | 1.5 | 0.8 | 25.6 |

The amount of imidizing agent is shown in parts with respect to 100 parts of the (meth)acrylic resin composition.

In the system in which the (meth)acrylic resin composition (2) containing a carboxylic acid group was used to cause a reaction, an imidized (meth)acrylic resin composition having a high imidization ratio was obtained in a short period of time, and the sun-screening agent resistance (Coppertone (registered trademark) resistance) was Unproved compared with that of (2).

On the other hand, in the system using the (meth)acrylic resin composition (6) not containing a carboxylic add group, the imidization ratio of the obtained imidized (meth)acrylic resin was low even if the reaction was allowed to continue for a long period of time, the yellowness index was very high, and the sun-screening agent resistance (Coppertone (registered trademark) resistance) was poor compared with that of (2).

Here, based on the NMR measurement, the MMA group content of the imidized (meth)acrylic resin after the reaction was smaller than the MMA group content of the (meth)acrylic resin composition before the reaction, and, thus, it seems that some MMA groups were converted into imide groups or methacrylic acid groups during the reaction.

Here, in an imidization reaction using an autoclave, the reaction time can be easily prolonged, and, thus, an imidized (meth)acrylic resin composition having a high reaction yield and a high acid content is obtained, and the Coppertone resistance is particularly excellent.

Example 26

A vented 15 mmφ intermeshing co-rotating double-screw extruder was used to react and extrude the resin pellets of the (meth)acrylic resin composition (1) produced in Example 1 using a 25 wt % ammonia water solution as an imidizing agent in the following manner, and an imidized (meth)acrylic resin composition was produced.

The resin pellets of the (meth)acrylic resin composition (1) were loaded from a hopper of the extruder at a discharge ratio of 2 kg/hour to fill a kneading zone in which the temperature was set to 230° C. Then, a liquid-adding pump was used to add 20 parts of the imidizing agent with respect to 100 parts of the methacrylic-based resin composition. After the reaction, byproducts and excessive imidizing agent were removed by reducing the vent-port pressure to ±0.02 MPa. The resin discharged from a die disposed at the extruder outlet was cooled in a water tank, and pelletized using a pelletizer.

Various properties of the obtained imidized (meth)acrylic resin composition were evaluated. The results together with the imidization ratio of the imidized (meth)acrylic resin composition are shown in Table 10. Table 10 also shows the properties of the (meth)acrylic resin composition (1).

Examples 27 to 29

Imidized (meth)acrylic resin compositions were produced as in Example 26, except that the type of (meth)acrylic resin composition and the number of parts of the ammonia solution added were changed as shown in Table 10.

Various properties of the obtained imidized (meth)acrylic resin compositions were evaluated. The results together with the imidization ratios of the imidized (meth)acrylic resin compositions are shown in Table 10.

Comparative Example 8

An imidized (meth)acrylic resin composition was produced as in Example 27, except that the type of (meth)acrylic resin composition was changed to a composition (6) not containing a carboxylic acid group.

Various properties of the obtained imidized (meth)acrylic resin composition were evaluated. The results together with the imidization ratio of the imidized (meth)acrylic resin are shown in Table 10.

Comparative Example 9

An imidized (meth)acrylic resin composition was produced as in Example 26, except that the type of (meth)acrylic resin composition was changed to a composition (6) not containing a carboxylic acid group, and the type and the amount of fluidizing agent were changed so that 10 parts of the methylamine were used.

Various properties of the obtained imidized (meth)acrylic resin composition were evaluated. The results together with the imidization ratio of the imidized (meth)acrylic resin composition are shown in Table 10.

TABLE 10

|  |  | Ex. | | | | | Com. Ex. | |
|---|---|---|---|---|---|---|---|---|
|  |  | 26 | 27 | 28 | 29 | Ref. | 8 | 9 |
| (Meth)acrylic resin composition | | (1) | (1) | (3) | (4) | (1) | (6) | (6) |
| Imidizing agent | Type | Ammonia solution | Ammonia solution | Ammonia solution | Ammonia solution | — | Ammonia solution | Methylamine |
|  | Amount (parts) | 20 | 60 | 40 | 40 | — | 60 | 10 |
| Reaction temperature (° C.) | | 270 | 270 | 270 | 270 | — | 270 | 270 |
| Imidization ratio (%) | | 22 | 34 | 21 | 10 | — | 0.5 | 35 |
| Acid value (mmol/g) | | 0.57 | 0.49 | 0.41 | 0.51 | 1.01 | 0 | 0.15 |
| Tg (° C.) | | 142 | 147 | 138 | 132 | 135 | 119 | 126 |
| Xylene resistance | | Good | Good | Good | Good | Good | Bad | Fair |
| Toluene resistance | | Good | Good | Good | Fair | Fair | Bad | Bad |
| Coppertone resistance (Test method 1) | 74° C. | Bad | Bad | Bad | Bad | Bad | Bad | Bad |
|  | 64° C. | Good | Good | Bad | Bad | Bad | Bad | Bad |
|  | 54° C. | Good | Good | Good | Good | Fair | Bad | Bad |
| Coppertone resistance (Test method 2) | | Good | Good | Good | Good | Good | Bad | Bad |
| Yellowness index | | 1.2 | 1.5 | 1.1 | 1.9 | 1.1 | 1.6 | 1.6 |
| Whitening-upon-folding resistance | | Good | Good | Good | Good | Good | Good | Good |

The amount of imidizing agent is shown in parts with respect to 100 parts of the (meth)acrylic resin composition.

In the system in which the (meth)acrylic resin composition (6) not containing a carboxylic acid group was used to cause an imidization reaction with ammonia, the reaction substantially did not progress. On the other hand, in the system in which the (meth)acrylic resin composition (1), (3), or (4) containing a carboxylic acid group was used to cause an imidization reaction with ammonia, an imidized (meth) acrylic resin composition having a high imidization ratio was obtained, and the sun-screening agent resistance (Coppertone (registered trademark) resistance) was improved compared with that of (1). Furthermore, in the imidized (meth)acrylic resin composition that had been imidized using methylamine, the imidization ratio was high, but the toluene resistance and the Coppertone resistance were not improved.

INDUSTRIAL APPLICABILITY

A (meth)acrylic resin composition or an imidized (meth) acrylic resin composition obtained in the present invention can be formed into various molded products using various plastic treatment methods, such as injection molding, extrusion molding, blow molding, compression molding, or the like.

A molded product obtained from the (meth)acrylic resin composition or the imidized (meth)acrylic resin composition of the present invention can be used, for example, in: shooting lenses, finders, filters, prisms, and Fresnel lenses for cameras, VTRs, and projectors in the imaging field; pick-up lenses for the optical disks of CD players, DVD players, and MD players in the lens field; components for the optical disks of CD players, DVD players, and ML) players in the optical recording field; light-guiding plates for liquid crystal, liquid crystal display films such as polarizer-protecting films and phase-difference films, and surface-protecting films in the information apparatus field; optical fibers, optical switches, optical connectors in the optical communication field; vehicle headlights, tail lamp lenses, inner lenses, instrument covers, sunroofs in the vehicle field; glasses, contact lenses, lenses for endoscopes, and other medical devices that need to be sterilized in the medical equipment apparatus field; road light-blocking plates, lenses for double glazing, lighting windows, carports, lenses for illumination, covers for illumination, sizing for building materials in the architecture and building material field; containers (dishes) for cooking in microwave ovens; housing of household electric appliance; toys; sunglasses; stationery; and the like.

A (meth)acrylic resin composition or an imidized (meth) acrylic resin composition obtained in the present invention is useful, in particular, as films, and can be used to laminate a metal, plastic, or the like.

A laminated product of the films obtained from the (meth) acrylic resin composition or the imidized (meth)acrylic resin composition of the present invention can be used in vehicle interior or exterior materials, convenience goods, wall papers, coating substitutes, housings for furniture and electrical equipment, housings for OA equipment such as facsimile machines, floor materials, components for electrical or electronic apparatuses, bathroom facilities, and the like.

The invention claimed is:

1. A (meth)acrylic resin composition obtained by heating a resin mixture comprising a (meth)acrylic-based resin (C) and a thermoplastic resin (D),
   wherein the (meth)acrylic-based resin (C) is obtained by polymerizing a monomer mixture (A) comprising:
   from 80 to 99 wt % of a linear alkyl (meth)acrylate; and
   from 1 to 20 wt % of tertiary-butyl (meth)acrylate,
   in the presence of an alkyl acrylate-based crosslinked elastic particle (B),
   wherein the alkyl acrylate-based crosslinked elastic particle (B) is obtained by mixing and polymerizing from 0.5 to 5 parts by weight of a polyfunctional monomer having at least two non-conjugated double bonds per molecule, with respect to 100 parts by weight of a monomer mixture comprising from 50 to 100 wt % of an alkyl acrylate monomer and from 0 to 50 wt % of an alkyl methacrylate monomer,
   wherein an acid value of the (meth)acrylic resin composition is from 0.2 to 0.7 mmol/g.

2. The (meth)acrylic resin composition according to claim 1, wherein the acid value of the (meth)acrylic resin composition is at least 0.3 mmol/g and lower than 0.7 mmol/g.

3. The (meth)acrylic resin composition according to claim 1, wherein a melt viscosity of the (meth)acrylic resin composition at 260° C. and 122 sec$^{-1}$ is not greater than 20000 poise.

4. A film obtained by molding the (meth)acrylic resin composition according to claim 1.

5. A laminated product obtained by laminating a metal or a plastic with a film obtained by molding the (meth)acrylic resin composition according to claim 1.

6. The (meth)acrylic resin composition according to claim 1, wherein the thermoplastic resin (D) has an acid value of lower than 0.7 mmol/g.

7. An imidized (meth)acrylic resin composition obtained by imidizing a (meth)acrylic resin composition obtained by heating a resin mixture comprising a (meth)acrylic-based resin (C) and a thermoplastic resin (D),
wherein the (meth)acrylic-based resin (C) is obtained by polymerizing a monomer mixture (A) comprising:
from 80 to 99 wt % of a linear alkyl (meth)acrylate; and
from 1 to 20 wt % of tertiary-butyl (meth)acrylate,
in the presence of an alkyl acrylate-based crosslinked elastic particle (B),
wherein the alkyl acrylate-based crosslinked elastic particle (B) is obtained by mixing and polymerizing from 0.5 to 5 parts by weight of a polyfunctional monomer having at least two non-conjugated double bonds per molecule, with respect to 100 parts by weight of a monomer mixture comprising from 50 to 100 wt % of an alkyl acrylate monomer and from 0 to 50 wt % of an alkyl methacrylate monomer,
wherein an acid value of the (meth)acrylic resin composition is from 0.2 to 0.7 mmol/g.

8. The imidized (meth)acrylic resin composition according to claim 7, wherein the thermoplastic resin (D) has an acid value of lower than 0.7 mmol/g.

9. A film obtained by molding an imidized (meth)acrylic resin composition obtained by imidizing a (meth)acrylic resin composition obtained by heating a resin mixture comprising a (meth)acrylic-based resin (C) and a thermoplastic resin (D),
wherein the (meth)acrylic-based resin (C) is obtained by polymerizing a monomer mixture (A) comprising:
from 80 to 99 wt % of a linear alkyl (meth)acrylate; and
from 1 to 20 wt % of tertiary-butyl (meth)acrylate,
in the presence of an alkyl acrylate-based crosslinked elastic particle (B),
wherein the alkyl acrylate-based crosslinked elastic particle (B) is obtained by mixing and polymerizing from 0.5 to 5 parts by weight of a polyfunctional monomer having at least two non-conjugated double bonds per molecule, with respect to 100 parts by weight of a monomer mixture comprising from 50 to 100 wt % of an alkyl acrylate monomer and from 0 to 50 wt % of an alkyl methacrylate monomer,
wherein an acid value of the (meth)acrylic resin composition is from 0.2 to 0.7 mmol/g.

10. The film according to claim 9, wherein the thermoplastic resin (D) has an acid value of lower than 0.7 mmol/g.

11. A laminated product obtained by laminating a metal or a plastic with a film obtained by molding an imidized (meth)acrylic resin composition obtained by imidizing a (meth)acrylic resin composition obtained by heating a resin mixture comprising a (meth)acrylic-based resin (C) and a thermoplastic resin (D),
wherein the (meth)acrylic-based resin (C) is obtained by polymerizing a monomer mixture (A) comprising:
from 80 to 99 wt % of a linear alkyl (meth)acrylate; and
from 1 to 20 wt % of tertiary-butyl (meth)acrylate,
in the presence of an alkyl acrylate-based crosslinked elastic particle (B),
wherein the alkyl acrylate-based crosslinked elastic particle (B) is obtained by mixing and polymerizing from 0.5 to 5 parts by weight of a polyfunctional monomer having at least two non-conjugated double bonds per molecule, with respect to 100 parts by weight of a monomer mixture comprising from 50 to 100 wt % of an alkyl acrylate monomer and from 0 to 50 wt % of an alkyl methacrylate monomer,
wherein an acid value of the (meth)acrylic resin composition is from 0.2 to 0.7 mmol/g.

12. The laminated product according to claim 11, wherein the thermoplastic resin (D) has an acid value of lower than 0.7 mmol/g.

* * * * *